United States Patent
Kumar et al.

(10) Patent No.: US 11,614,023 B2
(45) Date of Patent: Mar. 28, 2023

(54) CONTROL VALVE

(71) Applicant: HITACHI ASTEMO, LTD., Hitachinaka (JP)

(72) Inventors: Hari Lakshman Kumar, Hitachinaka (JP); Zhenyu Shen, Hitachinaka (JP); Shingo Murakami, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/437,792

(22) PCT Filed: Jan. 17, 2020

(86) PCT No.: PCT/JP2020/001404
§ 371 (c)(1),
(2) Date: Sep. 9, 2021

(87) PCT Pub. No.: WO2020/202705
PCT Pub. Date: Oct. 8, 2020

(65) Prior Publication Data
US 2022/0154626 A1 May 19, 2022

(30) Foreign Application Priority Data
Mar. 29, 2019 (JP) .............................. JP2019-065983

(51) Int. Cl.
*F01P 7/14* (2006.01)
*F01P 7/16* (2006.01)
(Continued)

(52) U.S. Cl.
CPC .............. *F01P 7/16* (2013.01); *F16K 11/076* (2013.01); *F16K 11/087* (2013.01)

(58) Field of Classification Search
CPC .......... F01P 7/14; F01P 2007/146; F01P 7/16; F16K 25/00; F16K 3/26; F16K 11/076; F16K 11/087
(Continued)

(56) References Cited

U.S. PATENT DOCUMENTS

| 2016/0010536 A1* | 1/2016 | Murakami | .......... F16K 11/0876 |
| | | | 137/625.44 |
| 2017/0122181 A1* | 5/2017 | Murakami | .............. F16K 11/22 |
| 2018/0051815 A1* | 2/2018 | Murakami | ................ F01P 7/14 |

FOREIGN PATENT DOCUMENTS

| JP | 2016-160872 A | 9/2016 |
| JP | 2018-123887 A | 8/2018 |

OTHER PUBLICATIONS

International Preliminary Report on Patentability dated Oct. 14, 2021 issued in corresponding International Application No. PCT/JP2020/001404, with English translation, 14 pages.
(Continued)

*Primary Examiner* — Hung Q Nguyen
*Assistant Examiner* — Anthony Donald Taylor, Jr.
(74) *Attorney, Agent, or Firm* — Foley & Lardner LLP

(57) ABSTRACT

A control valve according to the present invention is configured such that when a third opening part, which is an auxiliary opening part, and a third discharge opening, which is an auxiliary connection opening, do not overlap, the third opening part and a continuous discharge opening overlap. Thus, for example, when a flow rate of cooling water for continuous circulation is required, such as during a cold start, cooling water guided through an internal passage is discharged via the continuous discharge opening in addition to cooling water guided from a bypass passage, thereby ensuring a sufficient flow rate of cooling water for continuous circulation.

14 Claims, 13 Drawing Sheets

(51) Int. Cl.
    *F16K 11/076* (2006.01)
    *F16K 11/087* (2006.01)
(58) Field of Classification Search
    USPC .......................................... 123/41.08, 41.09
    See application file for complete search history.

(56) References Cited

OTHER PUBLICATIONS

International Search Report dated Mar. 17, 2020 issued in International Application No. PCT/JP2020/001404, with English translation, 5 pages.

* cited by examiner

CONTROL VALVE

TECHNICAL FIELD

The present invention relates to a control valve.

BACKGROUND ART

Patent Document 1 cited below discloses a conventional control valve.

In brief, the control valve includes a bypass passage structured to continuously discharge cooling water regardless of a rotational position of a valve so as to continuously circulate the cooling water. The bypass passage is formed between the valve and a housing (i.e. formed in a gap in a radial direction), and is connected to the outside via a continuous circulation port of the housing.

PRIOR ART DOCUMENT(S)

Patent Document(s)

Patent Document 1: JP 2016-160872 A

SUMMARY OF THE INVENTION

Problem(s) to be Solved by the Invention

However, the conventional control valve described above may be insufficient in flow rate of the cooling water for the continuous circulation, because of a small flow passage sectional area of the bypass passage formed between the valve and the housing.

In view of the foregoing technical problem, it is desirable to provide a control valve structured to ensure a sufficient flow rate of cooling water for continuous circulation.

Means for Solving the Problem(s)

According to one aspect of the present invention, a control valve for a cooling circuit of a prime mover of an automobile includes a housing and a valve, wherein: the housing includes a valve container containing the valve, a primary communication port open to the valve container in an axial direction, and a secondary communication port open to the valve container in a radial direction; the housing further includes a continuous circulation port that is open to the valve container, and is different from the secondary communication port in position in a circumferential direction, and is positioned to overlap with the secondary communication port in position in the axial direction; and the valve includes a secondary opening that overlaps with the continuous circulation port, at least in case that the secondary opening is apart from the secondary communication port.

Effect(s) of the Invention

The present invention serves to ensure a sufficient flow rate of cooling water for continuous circulation.

BRIEF DESCRIPTION OF THE DRAWINGS

FIG. 10A shows a state in which only a third outlet port is communicatable. FIG. 10B shows a state in which only a second outlet port is communicatable. FIG. 10C shows a state in which only a continuous outlet port is communicatable. FIG. 10D shows a state in which each of the second outlet port and a first outlet port is communicatable. FIG. 10E shows a state in which each of the first outlet port and the third outlet port is communicatable.

MODE(S) FOR CARRYING OUT THE INVENTION

The following describes embodiments of a control valve according to the present invention, with reference to the drawings. Each of the embodiments below shows an example in which a control valve is employed in a conventional circulation system of cooling water for an automobile: hereinafter, it is referred to as "cooling water" simply.

(Configurations of Cooling Water Circulation Circuit)

Figure 1:
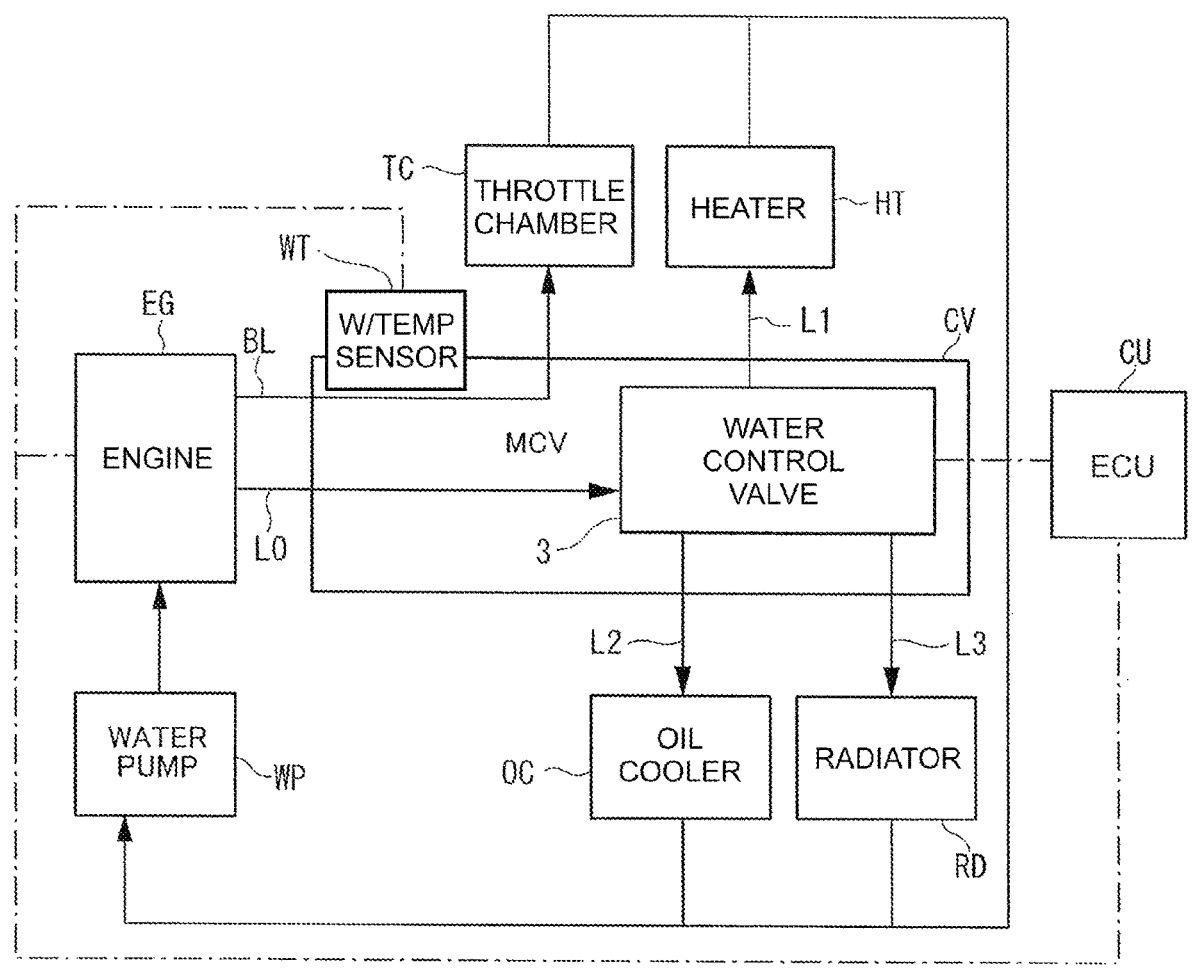
FIG. 1 is a block diagram showing configurations of a circulation circuit of cooling water for an automobile which employs a control valve according to the present invention.

FIG. 1 is a block diagram showing configurations of a circulation circuit of the cooling water which serves as a cooling circuit of a prime mover of an automobile, wherein the circulation circuit employs a control valve according to the present invention.

Control valve CV is disposed beside an engine EG: specifically, beside a cylinder head not shown. As shown in FIG. 1, control valve CV is surrounded by a heater HT, an oil cooler OC, and a radiator RD. Heater HT is a heat exchanger for heating, and is structured to produce warm wind of an air conditioner not shown. Oil cooler OC is structured to cool oil for lubrication of sliding contact parts inside the engine EG. Radiator RD is structured to cool the cooling water for cooling of engine EG.

The reference sign WP in the drawing represents a water pump for circulation of the cooling water. The reference sign WT represents a water temperature sensor for drive control of control valve CV. Control valve CV is controlled based on control electric current from an electronic control unit CU depending on measurement results of water temperature sensor WT. The reference sign TC represents a throttle chamber structured to control a flow rate of air to be mixed with fuel for combustion inside the engine EG.

Specifically, the cooling water discharged from water pump WP is introduced to control valve CV via an inlet passage L0. Control valve CV includes a valve 3 driven under control of electronic control unit CU depending on operational conditions of engine EG such as the measurement results of water temperature sensor WT. Due to the driving of valve 3, the cooling water introduced to control valve CV via inlet passage L0 is distributed to heater HT, oil cooler OC, and radiator RD, respectively via a first pipe L1, a second pipe L2, and a third pipe L3.

Control valve CV further includes a bypass passage BL for directly introducing the cooling water from engine EG to throttle chamber TC by bypassing the inlet passage L0. Bypass passage BL continuously supplies the cooling water, which is introduced to control valve CV via inlet passage L0, to throttle chamber TC.

Thus, control valve CV serves as a 1in-3out type distribution device, and distributes the cooling water, which is introduced to control valve CV via inlet passage L0, to the first, second, and third pipes L1 to L3, while controlling flow rates of the cooling water upon the distribution.

The embodiments exemplify engine EG, i.e. the internal combustion engine, as an example of a prime mover of an automobile. However, the prime mover is not limited to engine EG, but may be any device structured to convert energy to motive power, such as a motor or a fuel cell.

Figure 2:
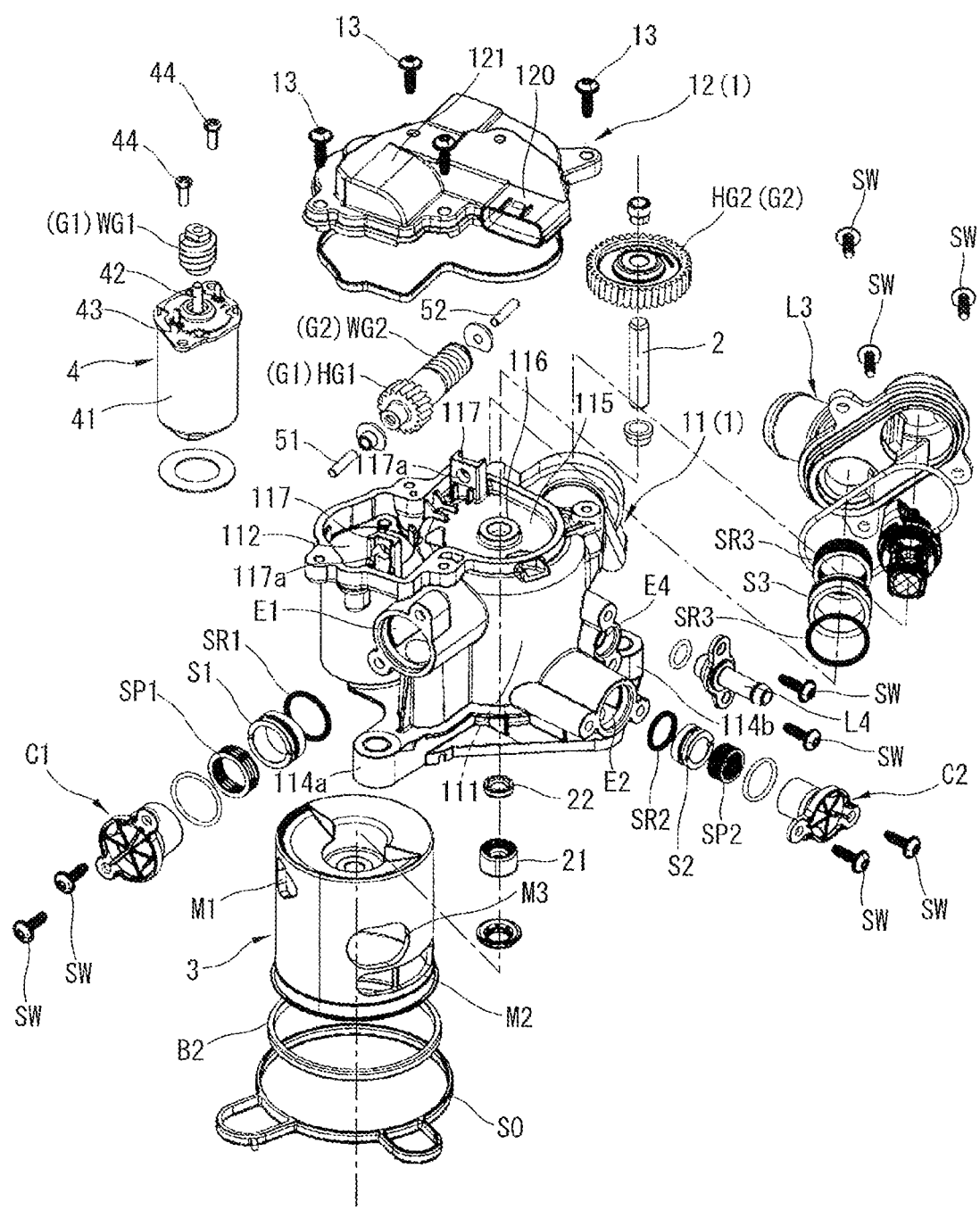
FIG. 2 is an exploded perspective view of a control valve according to a first embodiment of the present invention.
Figure 3:
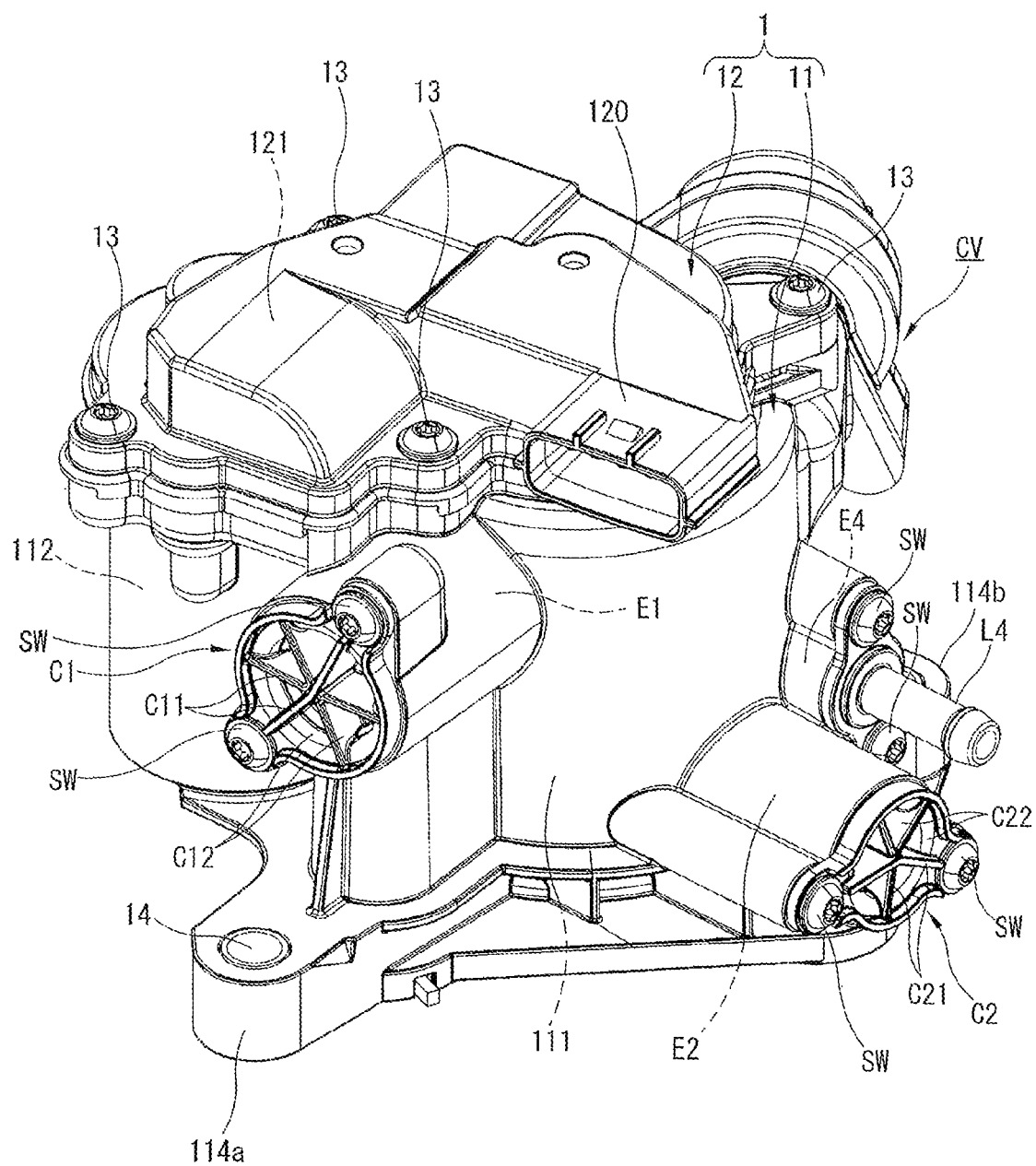
FIG. 3 is a perspective view of the control valve according to the present invention when viewed from a side of a second housing.
Figure 4:
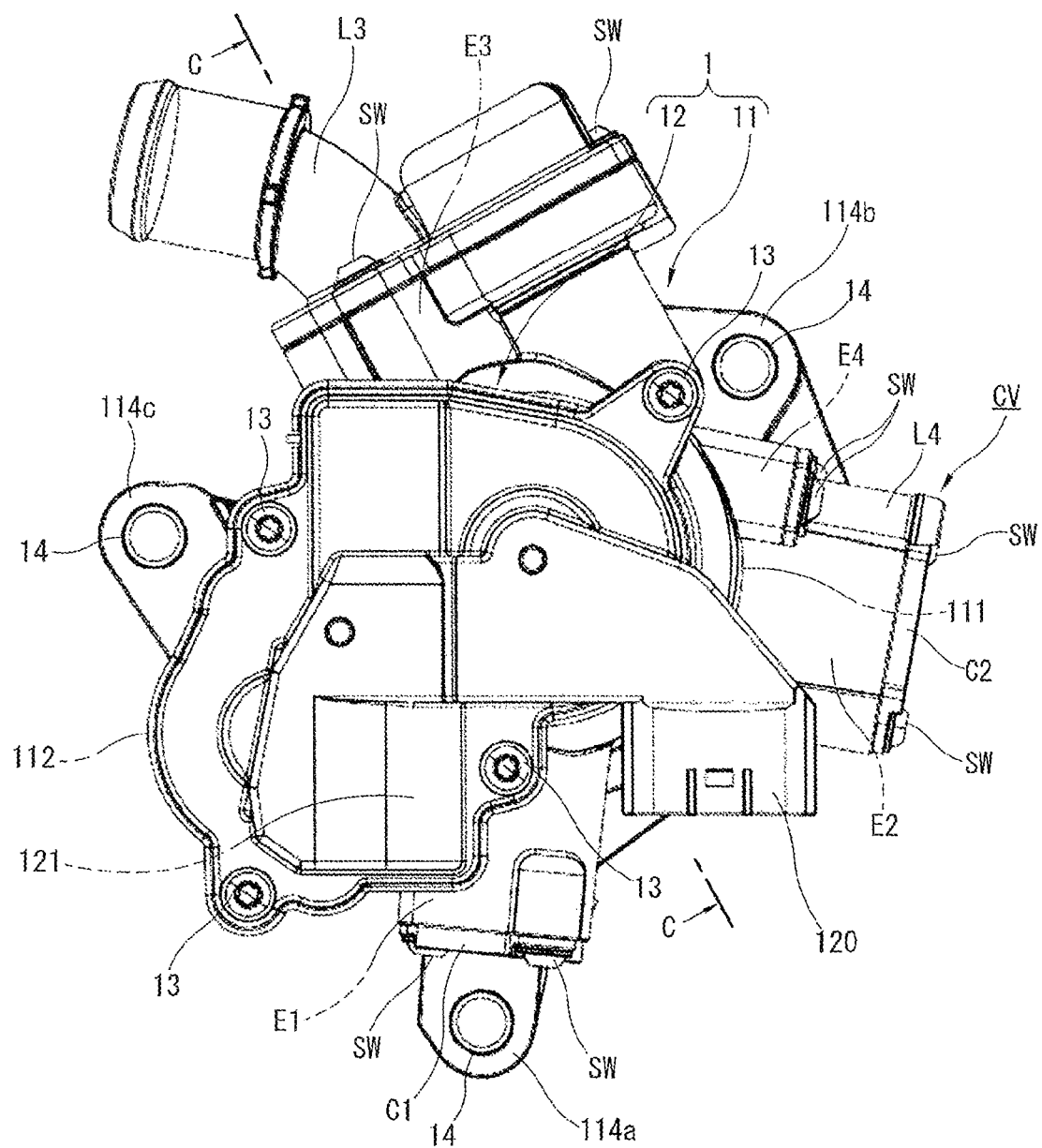
FIG. 4 is a plan view of the control valve in FIG. 3.
Figure 5:
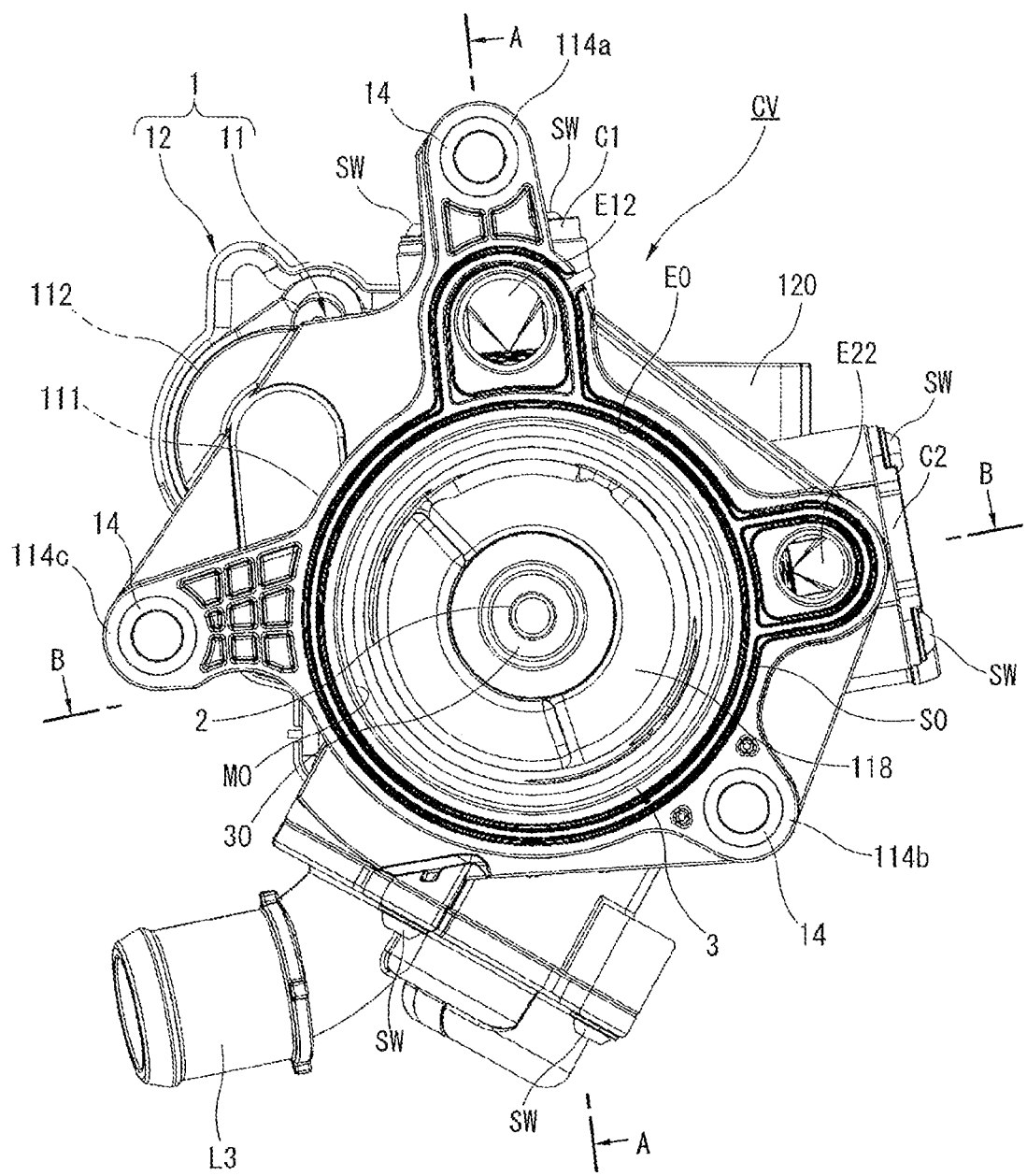
FIG. 5 is a bottom view of the control valve in FIG. 3.

First Embodiment (Configurations of Control Valve) FIG. 2 is an exploded perspective view of control valve CV according to the present invention. FIG. 3 is a perspective view of control valve CV according to the present invention when viewed from a side of a second housing 12. FIG. 4 is a plan view of control valve CV shown in FIG. 3. FIG. 5 is a bottom view of control valve CV shown in FIG. 3. In the following explanation of the drawings, "axial direction" refers to a direction parallel with a rotational axis Z of a rotational shaft 2, and "radial direction" refers to a direction perpendicular to rotational axis Z of rotational shaft 2, and "circumferential direction" refers to a direction around rotational axis Z of rotational shaft 2. Furthermore, in the axial direction, "first side" refers to an upper side in FIG. 2, and "second side" refers to a lower side in FIG. 2.

As shown in FIG. 2, control valve CV includes valve 3, an electric motor 4, and a speed reducer 5. Valve 3 has a tubular shape, and is rotatably supported inside a housing 1 by rotational shaft 2. Electric motor 4 is contained in housing 1, and is structured to rotate valve 3. Speed reducer 5 is contained in housing 1, and is structured to transfer rotation of electric motor 4 with deceleration.

Housing 1 is composed of two components separated in the axial direction: a first housing 11 and a second housing 12. First housing 11 contains valve 3 and electric motor 4. Second housing 12 contains speed reducer 5, and is disposed to close a first side opening of first housing 11. First housing 11 and second housing 12 are both made of a synthetic resin such as a polyphenylene sulfide (PPS), and are fixed to each other with bolts 13.

First housing 11 includes a valve container 111 and a motor container 112. Valve container 111 has a shape of a hollow cylinder to contains valve 3. Motor container 112 has a shape of a hollow cylinder to contain electric motor 4, and is disposed in parallel with valve container 111. First housing 11 includes mounting portions (specifically, flanges 114a, 114b, and 114c describes below) in an axial second side end thereof, and is fixed to a cylinder block not shown with fixing members not shown such as bolts, via the mounting portions. The mounting portions and the cylinder block not shown interpose therebetween a gasket S0 having an annular shape and establishing liquid-tight sealing between the mounting portions and the cylinder block.

Valve container 111 includes an axial first side end that is closed by an end wall 113, and the axial second end that is open (see FIG. 5). As shown in FIG. 5, the axial second side end of valve container 111 includes a plurality of flanges 114a, 114b, and 114c (e.g. three in the present embodiment) for mounting the first housing 11 to the cylinder block not shown. Flanges 114a, 114b, and 114c extend outward, substantially in the radial direction, and are arranged at approximately equal intervals in the circumferential direction. Each of flanges 114a, 114b, and 114c includes in its tip a through hole having a circular shape and extending in the axial direction. Each of the through holes of flanges 114a, 114b, and 114c contains a sleeve 14 that is made of a metal and has a cylindrical shape, wherein the sleeve 14 is press-fitted in the each of the through holes. Sleeves 14 are respectively equal to flanges 114a, 114b, and 114c in height (i.e. axial dimension), and are structured to receive axial forces from the bolts not shown.

As shown in FIG. 2, end wall 113 of valve container 111 includes a boss 115 that has a shape of a cylinder with a lid and projects toward second housing 12. Boss 115 includes an end wall including a through hole 116 in which rotational shaft 2 inserted, wherein rotational shaft 2 extends through the through hole 116. End wall 113 of valve container 111 further includes a pair of bearings 117, 117 having shapes of flat plates rising straight and serving as bearings for support shafts 51 and 52 of speed reducer 5. The pair of bearings 117, 117 respectively include bearing holes 117a, 117a that rotatably support the support shafts 51 and 52.

Valve container 111 of first housing 11 includes a side wall (i.e. a peripheral wall) including a first outlet port E1, a second outlet port E2, and a third outlet port E3 that connect valve container 111 to heater HT, oil cooler OC, and radiator RD (see FIG. 1). As shown in FIGS. 2 to 5, first and second outlet ports E1 and E2 out of the outlet ports E1 to E3 respectively include radial openings E1l and E21 being radial through holes open at the peripheral wall of first housing 11 (see FIG. 2), and further respectively include axial openings E12 and E22 being axial through holes respectively open at inner end faces of flanges 114a and 114b (see FIG. 5). Thus, each of first outlet port E1 and second outlet port E2 includes a substantially T-shaped internal passage not shown. Radial opening E11 of first outlet port E1 and radial opening E21 of second outlet port E2 are respectively closed by a cap C1 and a cap C2. First outlet port E1 is connected to heater HT via axial opening E12, and second outlet port E2 is connected to oil cooler OC via axial opening E22. Cap C1 includes ribs C11 radially extending and thinned portions C12 formed between ribs C11. Cap C2 includes ribs C21 radially extending and thinned portions C22 formed between ribs C21. On the other hand, each of third outlet port E3 and continuous outlet port E4 has a cylindrical shape, and is formed to open at the peripheral wall of first housing 11. Third discharge port E3 includes a radial opening E31 including an outer end to which third pipe L3 connected to radiator RD is mounted. Continuous outlet port E4 includes a radial opening E41 including an outer end to which a fourth pipe L4 connected to throttle chamber TC is mounted. Each of first cap C1, second cap C2, third pipe L3, fourth pipe L4 is fixed to first housing 11 with screws SW.

Second housing 12 has a shape of a bottomed cylinder that is open so as to straddlingly cover the valve container 111 and the motor container 112. Second housing 12 includes an inner space that defines speed reducer container 121 to contain speed reducer 5 when second housing 12 is mounted to first housing 11 so as to cover the valve container 111 and the motor container 112. Second housing 12 includes a connector acceptor 120 for connection with electronic control unit CU, wherein connector acceptor 120 is integrally formed in a side portion of second housing 12. Electronic control unit CU is electrically connected to electric motor 4 via connector acceptor 120.

Electric motor 4 includes a motor body 41 and an output shaft 42, wherein motor body 41 is contained in motor container 112 such that output shaft 42 is directed toward second housing 12. Electric motor 4 further includes a flange 43 formed in an end of motor body 41 adjacent to output shaft 42 and shaped to extend radially outwardly. Via flange 43, electric motor 4 is fixed to an opening edge of motor container 112 with bolts 44. Electric motor 4 is driven under control of in-vehicle electronic control unit CU (see FIG. 1), and rotates valve 3 depending on operation conditions of the vehicle. This allows the cooling water to be appropriately distributed to radiator RD etc. (see FIG. 1).

Speed reducer 5 is a drive mechanism composed of a pair of skew gears, i.e., a first gear G1 and a second gear G2. First gear G1 is composed of a first worm WG1 and a first worm wheel HG1. First worm WG1 is disposed coaxially with output shaft 42 of electric motor 4, and is structured to rotate integrally with output shaft 42. First worm wheel HG1 is rotatably supported by support shaft 51 extending perpendicularly to output shaft 42, and engages with first worm WG1. Second gear G2 is composed of a second worm WG2 and a second worm wheel HG2. Second worm WG2 is rotatably supported by support shaft 52, and is structured to rotate integrally with first worm wheel HG1. Second worm wheel HG2 is fixed to rotational shaft 2, and engages with second worm WG2. First worm wheel HG1 and second worm WG2 are parts of a cylindrical composite gear member in which first worm wheel HG1 and second worm WG2 are arranged in series and are integrally formed. Thus, first worm wheel HG1 and second worm WG2 are rotatably supported by the pair of bearings 117, 117 of first housing 11, via support shafts 51 and 52 inserted in both ends of the composite gear member. This allows a rotational drive force outputted from electric motor 4 to be transferred to valve 3 with two-step deceleration via first gear G1 and second gear G2.

Figure 6:
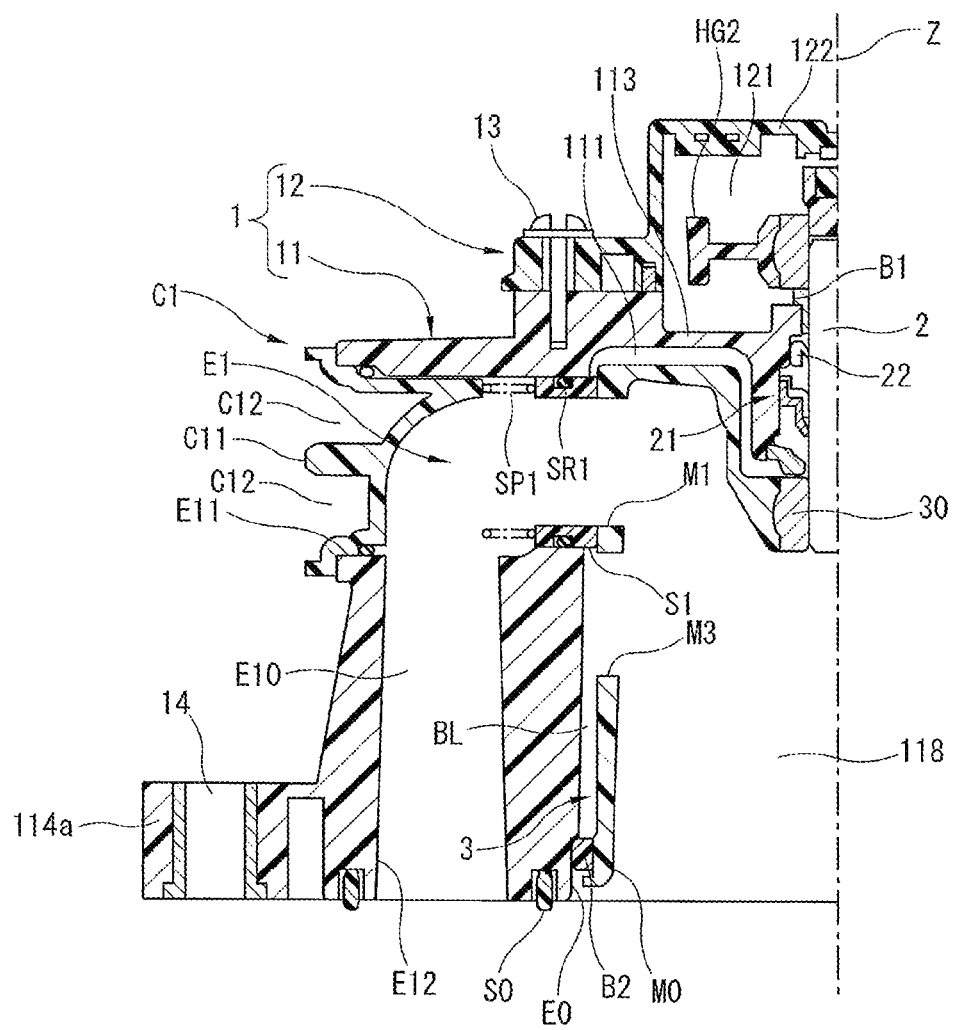
FIG. 6 is a sectional view along a line A-A in FIG. 5.
Figure 7:
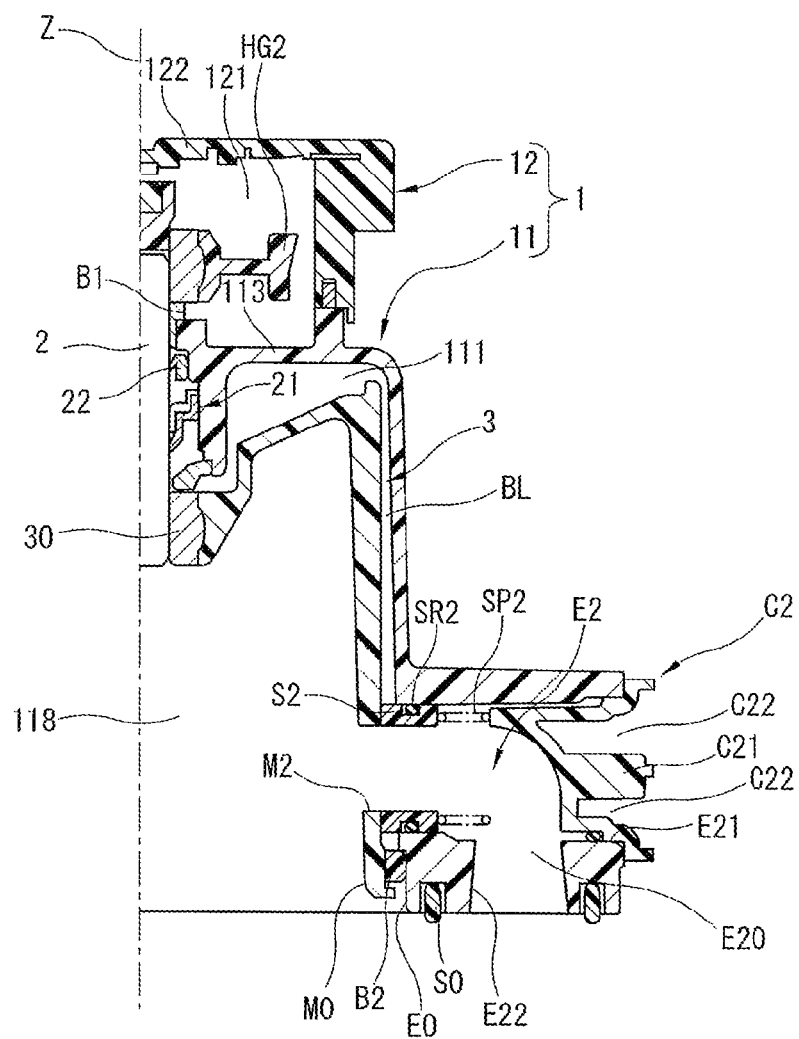
FIG. 7 is a sectional view along a line B-B in FIG. 5.
Figure 8:
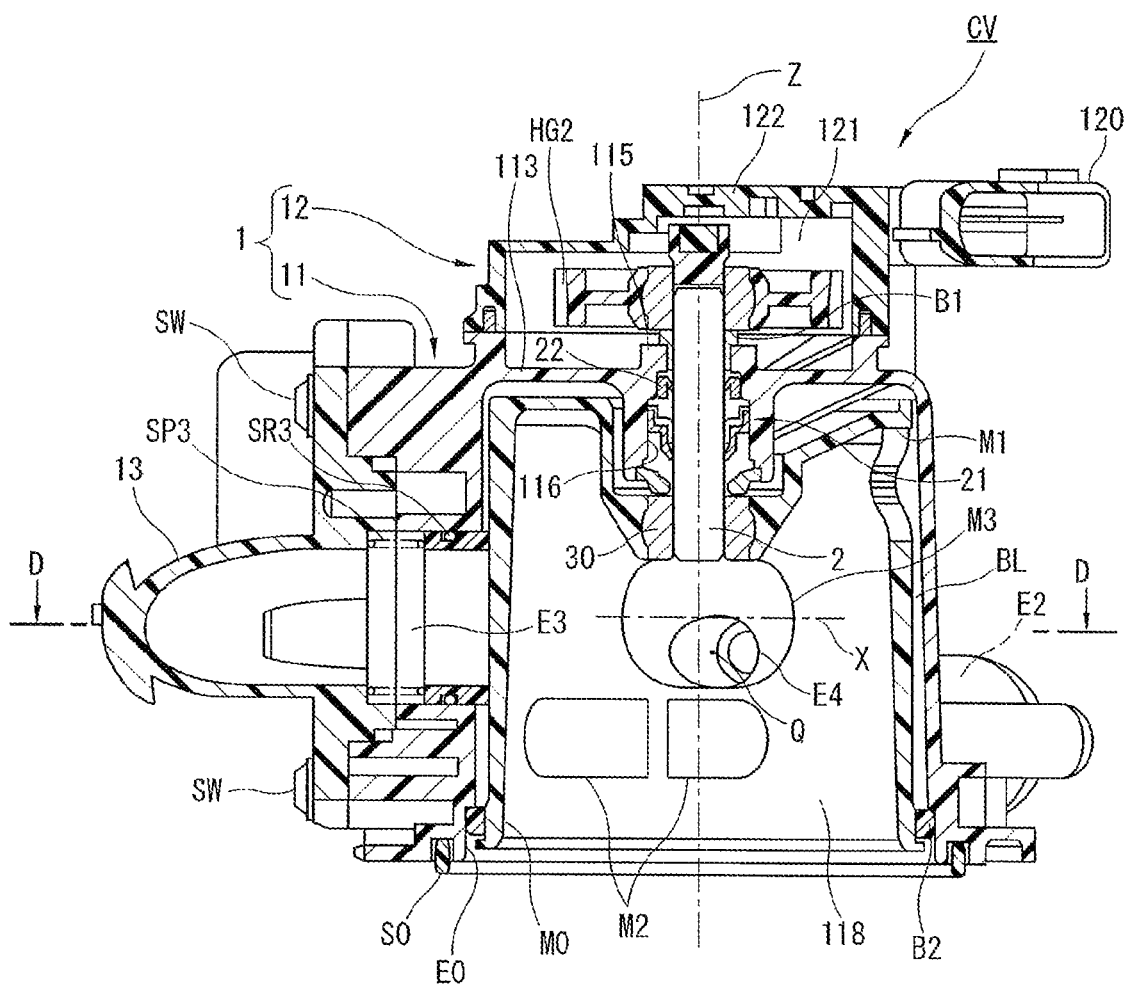
FIG. 8 is a sectional view along a line C-C in FIG. 4.
Figure 9:
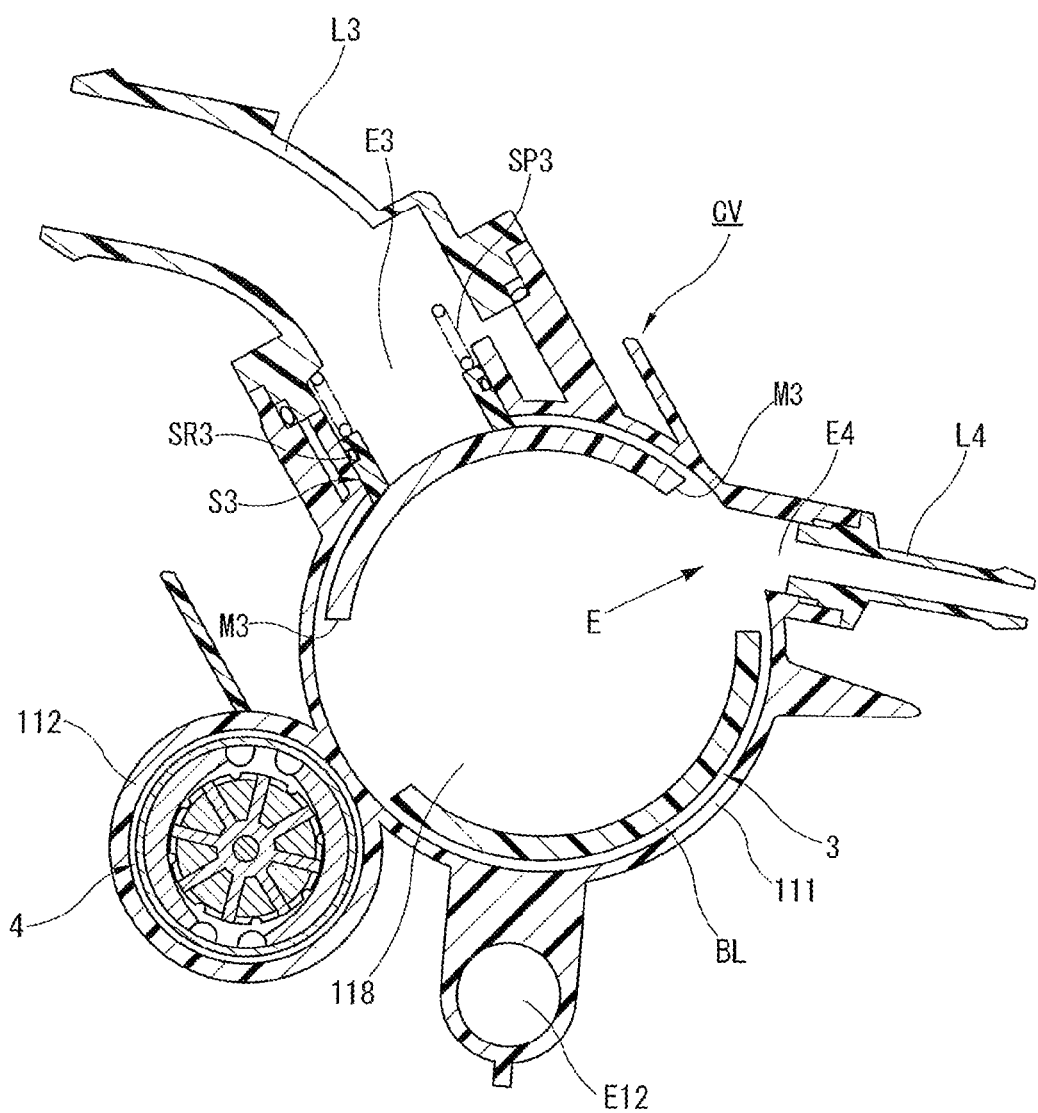
FIG. 9 is a sectional view along a line D-D in FIG. 8.

FIG. 6 is a sectional view of control valve CV at a section along a line A-A shown in FIG. 5. FIG. 7 is a sectional view of control valve CV at a section along a line B-B shown in FIG. 5. FIG. 8 is a sectional view of control valve CV at a section along a line C-C shown in FIG. 4. FIG. 9 is a sectional view of control valve CV at a section along a line D-D shown in FIG. 8.

In the following explanation of the drawings, the axial direction refers to the direction parallel with rotational axis Z of rotational shaft 2, and the radial direction refers to the direction perpendicular to rotational axis Z of rotational shaft 2, and the circumferential direction refers to the direction around rotational axis Z of rotational shaft 2. Furthermore, in the axial direction, "first side" refers to an upper side in FIGS. 6 to 8, and "second side" refers to a lower side in FIGS. 6 to 8.

As shown in FIGS. 6 to 8, first housing 11 includes valve container 111 having the shape of bottomed cylinder, and includes the axial first side end that is closed by end wall 113 and the axial second end that is open to the outside. End wall 113 of valve container 111 includes boss 115 including through hole 116 in which rotational shaft 2 is inserted. Through hole 116 extends in the axial direction so as to establish communication between valve container 111 and speed reducer container 121 described below. In other words, through hole 116 is positioned axially oppositely to an opening of an inlet port E0 described below, and opens to valve container 111.

Second housing 12 mounted to first housing 11 from the first side has the shape of bottomed tube, and includes an axial first side end that is closed by a bottom wall 122 and an axial second side end that is open and is disposed to face the end wall 113. Second housing 12 is placed over first housing 11 so as to close the axial first side end of first housing 11. This causes speed reducer container 121 to be formed in the internal space of second housing 12. Then, speed reducer 5 is contained in speed reducer container 121.

First housing 11 includes intake port E0 in the axial second end side of valve container 111. Intake port E0 includes the opening, and serves as a primary communication port that is in communication with an inside of the cylinder block not shown, for introduction of the cooling water from the cylinder block. In detail, inlet port E0 is in communication with an opening of the cylinder block, in a state in which control valve CV is mounted to the engine not shown (i.e. to the cylinder block). This allows the cooling water to be introduced from the cylinder block to valve container 111 via intake port EQ.

Valve container 111 includes the peripheral wall in which first outlet port E1, second outlet port E2, third outlet port E3 are formed as secondary communication ports establishing communication between valve container 111 and the outside, wherein each of the secondary communication ports has a substantially circular cross section. In other words, in the peripheral wall of valve container 111, first to third outlet ports E1 to E3 being the secondary communication ports are formed to extend in the radial direction and open to valve container 111. Out of first to third outlet ports E1 to E3, first outlet port E1 has the substantially T-shaped internal passage that includes radial opening E11 closed by cap C1 and opens in a side of flange 114a via axial opening E12. Second outlet port E2 has the substantially T-shaped internal passage that includes radial opening E21 closed by cap C2 and opens in a side of flange 114b via axial opening E22. On the other hand, third outlet port E3 is connected to third pipe L3 that has a substantially L-shape, i.e., includes a middle portion bent at a substantially right angle. First outlet port E1 is connected, for example, to heater HT via axial opening E12. Specifically, the cooling water discharged from axial opening E12 of first outlet port E1 is supplied to heater HT via the cylinder block not shown. Second outlet port E2 is connected, for example, to oil cooler OC via axial opening E22. Specifically, the cooling water discharged from axial opening E22 of second outlet port E2 is supplied to oil cooler OC via the cylinder block not shown. Third outlet port E3 is connected, for example, to radiator RD via third pipe L3.

First outlet port E1, second outlet port E2, and third outlet port E3 are different from each other in axial position. First outlet port E1, second outlet port E2, and third outlet port E3 are arranged at axial intervals set to allow a first seal member S1, a second seal member S2, and a third seal member S3 described below to respectively overlap with a first opening M1, a second opening M2, and a third opening M3 described below, wherein the openings M1 to M3 are arranged in valve 3 at adjacent axial positions. Furthermore, first to third outlet ports E1 to E3 are different from each other in circumferential position. Specifically, first to third outlet ports E1 to E3 are arranged in the peripheral wall of first housing 11, at approximately 90° intervals in phase (see FIG. 4).

Each of first to third outlet ports E1 to E3 includes an inner end provided with a seal mechanism establishing gastight sealing between the each of first to third outlet ports E1 to E3 and valve 3, wherein the inner ends of first and second outlet ports E1 and E2 refer to inner ends of radial openings E11 and E21. Each of the seal mechanisms is composed of a corresponding one of first to third seal members S1 to S3 and a corresponding one of first to third coil springs SP1 to SP3. Each of first to third seal members S1 to S3 is made of a synthetic resin, and has a substantially cylindrical shape. Each of first to third coil springs SP1 to SP3 biases a corresponding one of first to third seal members S1 to S3 toward valve 3. Each of first to third seal members S1 to S3 includes an outer periphery to which a corresponding one of first to third seal rings SR1 to SR3 structured for sliding contact with first to third outlet ports E1 to E3.

Each of first to third seal members S1 to S3 is made of a predetermined fluororesin (e.g. a polytetrafluoroethylene (PTFE) in the present embodiment), and is contained in an inner peripheral side of a corresponding one of first to third outlet ports E1 to E3, so as to be movable in a direction toward valve 3. Each of first to third coil springs SP1 to SP3 is a bias member interposed with a predetermined set load between a corresponding one of first to third seal members S1 to S3 and a corresponding one of first cap C1, second cap C3, and third pipe L3, and structured to bias the corresponding one of first to third seal members S1 to S3 toward valve 3.

As shown in FIGS. 8 and 9, the peripheral wall of valve container 111 includes continuous outlet port E4 serving as a continuous communication port for discharging the cooling water independently of a phase (i.e. a rotational position) of valve 3. Continuous outlet port E4 diagonally pierces the peripheral wall of valve container 111. In other words, continuous outlet port E4 extends in a direction not to cross the rotational axis Z of valve 3, and does not overlap with rotational axis Z in the direction of piercing, and has a shape of an oval or ellipse elongated in the circumferential direction, in a plan view (see FIG. 8). Continuous outlet port E4 is different from first to third outlet ports E1 to E3 in circumferential position, while being positioned to overlap with one of first to third outlet ports E1 to E3 in the axial direction. In detail, continuous outlet port E4 is different from first to third outlet ports E1 to E3 in circumferential position, while being positioned to overlap with an opening (e.g. third opening M3 in the present embodiment) of valve 3 in the axial direction. In other words, continuous outlet port E4 is formed at a position to overlap with third opening M3 being the opening of valve 3 formed to overlaps with third outlet port E3, such that both of third outlet port E3 and continuous outlet port E4 is allowed to use third opening M3. Furthermore, continuous outlet port E4 is less in opening area than the opening (e.g. third opening M3 in the present embodiment) of valve 3, and, in the present embodiment, is positioned such that a center Q of continuous outlet port E4 is shifted toward inlet port E0 with respect to a center of third opening M3 (i.e. a base line X shown in FIG. 8). In this case, continuous outlet port E4 is formed such that the entire of continuous outlet port E4 overlaps with third opening M3 in the axial direction.

Continuous outlet port E4 is positioned such that continuous outlet port E4 is allowed to overlap with third opening M3 in a state in which third opening M3 does not overlap with third outlet port E3 in the circumferential direction, as described below (see FIG. 10C for example).

The continuous communication port according to the present invention may be one to allow continuous outlet port E4 to overlap with third opening M3 even when in which first to third openings M1 to M3 overlap with first to third outlet ports E1 to E3, provided that the continuous communication port is formed at a position to allow the continuous communication port to overlap with third opening M3 when first to third openings M1 to M3 do not overlap with first to third outlet ports E1 to E3.

Thus-configured continuous outlet port E4 receives cooling water that is introduced via an inside of valve 3 (i.e. via an internal passage 118 described below) and flows into continuous outlet port E4 via third opening M3, while receiving cooling water that is introduced to valve container 111 via intake port E0 and flows into continuous outlet port E4 via bypass passage BL formed between first housing 11 and valve 3 (i.e. in a gap in the radial direction). In other words, the cooling water introduced via the inside of valve 3 (i.e. via internal passage 118 described below) joins the cooling water introduced via bypass passage BL, at continuous outlet port E4, and is discharged from continuous outlet port E4.

Rotational shaft 2 has a rod shape with a constant outer diameter, and extends over valve container 111 and speed reducer container 121 through the through hole 116, and is rotatably supported by a bearing B1 contained and retained on an inner periphery of boss 115. Rotational shaft 2 and through hole 116 interpose therebetween a seal member 21 press-fittingly inserted from a side of valve container 111, in order to establish liquid-tight sealing between rotational shaft 2 and through hole 116. Seal member 21 serves to suppress the cooling water in valve container 111 from flowing into second housing 12 via through hole 116. Furthermore, seal member 21 and bearing B1 interpose a dust seal 22 therebetween. Dust seal 22 serves to suppress dust in speed reducer container 121 from intruding into valve container 111. This serves to reduce dust jamming between through hole 116 and seal member 21, and thereby protect seal member 21.

Valve 3 is made of a predetermined rigid resin, and has a shape of a bottomed cylinder with a constant outer diameter. Valve 3 includes an inlet M0 that is an opening at a second side end of valve 3 and faces intake port E0. This allows the cooling water to be introduced to internal passage 118 defined inside the valve 3. Valve 3 includes a first side end in the axial direction which is press-fitted to rotational shaft 2 via an insertion member 30 made of a metal and embedded in an inner periphery of the first side end of valve 3. The second side end of valve 3 facing the intake port E0 is rotatably supported by a bearing B2 retained on an inner periphery of intake port E0.

Valve 3 includes, in its peripheral wall, first opening M1, second opening M2, and third opening M3 each of which extends through the peripheral wall of valve 3. First to third openings M1 to M3 respectively corresponds in axial position to first to third outlet ports E1 to E3. Each of first to third openings M1 to M3 communicates with the corresponding one of first to third outlet ports E1 to E3, at a predetermined rotational position (i.e. a phase). In addition, first to third openings M1 to M3 are set with a number and shapes (e.g. circles, circumferentially elongated ovals, etc.) depending on a control method of valve 3. Furthermore, according to the present embodiment, third opening M3 is greater in opening area than continuous outlet port E4 (see FIG. 8), and is allowed to communicate with continuous outlet port E4 besides third outlet port E3, depending on the rotational position of valve 3.

Thus-configured control valve CV distributes the cooling water to heater HT via first outlet port E1, in response to satisfaction of a condition that valve 3 is controlled to a circumferential position at which first opening M1 overlaps with at least a part of first outlet port E1. Similarly, control valve CV distributes the cooling water to oil cooler OC via second outlet port E2, in response to satisfaction of a condition that valve 3 is controlled to a circumferential position at which second opening M2 overlaps with at least a part of second outlet port E2. Control valve CV distributes the cooling water to radiator RD via third outlet port E3 (i.e. via third pipe L3), in response to satisfaction of a condition that valve 3 is controlled to a circumferential position at which third opening M3 overlaps with at least a part of third outlet port E3. Upon the distribution of the cooling water, the flow rate of the distributed cooling water varies depending on overlapping conditions (i.e. overlapping areas) between first to third openings M1 to M3 and first to third outlet ports E1 to E3.

Figure 10A:
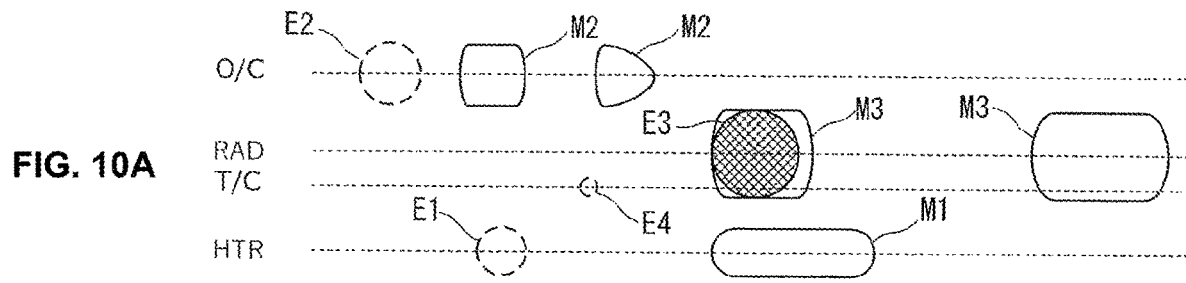
FIGS. 10A to 10E are development views of a valve container for illustration of operation of the control valve according to the present invention.
Figure 10B:
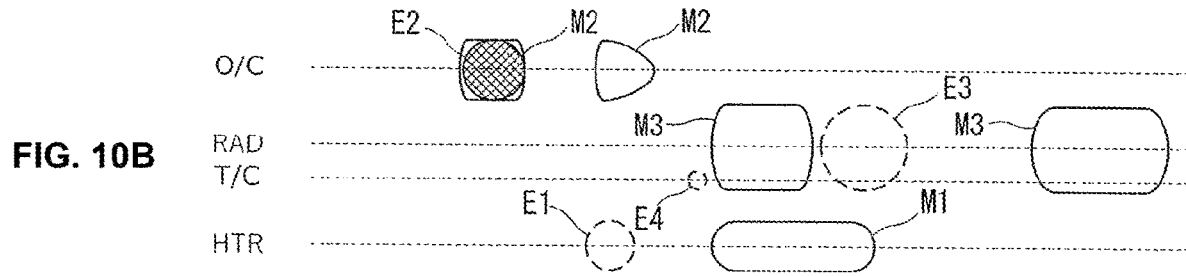
Figure 10C:
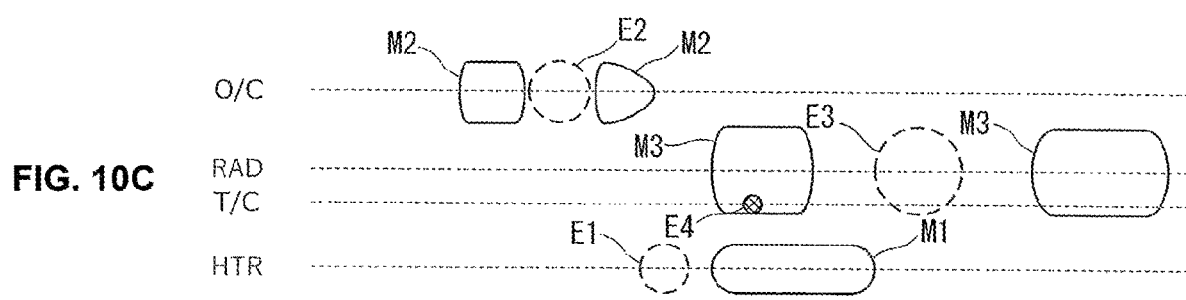
Figure 10D:
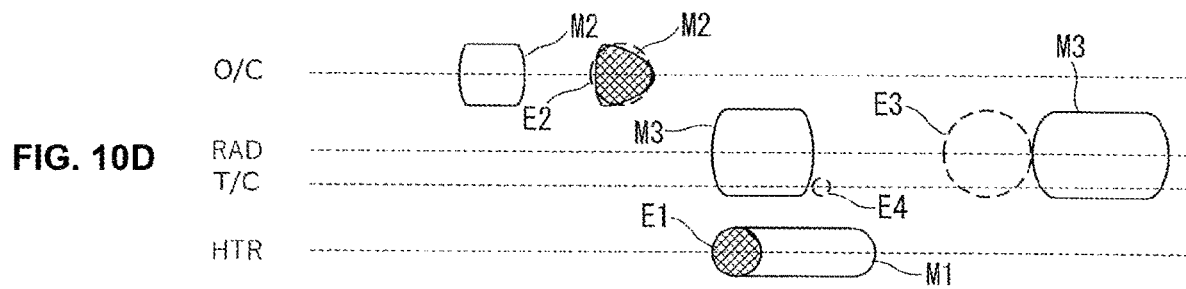
Figure 10E:
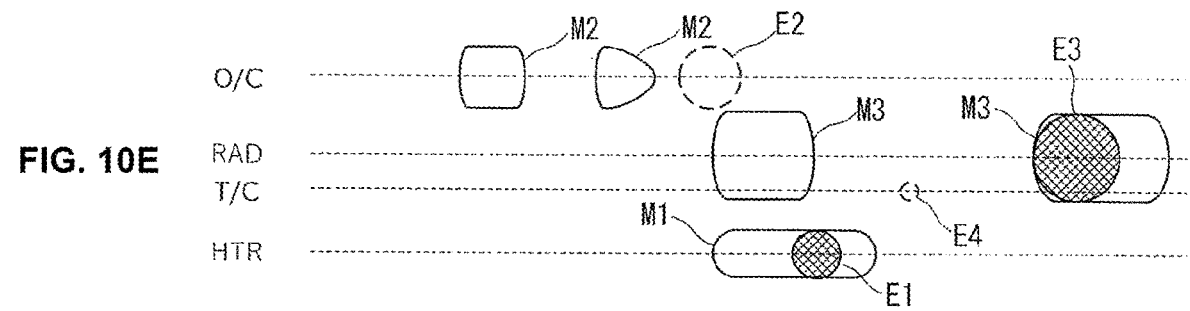

(Explanation for Operation of Control Valve) FIGS. 10A to 10E are development views of control valve CV for illustration of operation states of control valve CV. FIG. 10A shows a state in which only the third discharge port E3 is communicatable. FIG. 10B shows a state in which only the second outlet port E2 is communicatable. FIG. 10C shows a state in which only the continuous outlet port E4 is communicatable, and all of first to third outlet ports E1 to E3 are not communicatable. FIG. 10D shows a state in which each of first outlet port E1 and second outlet port E2 is communicatable. FIG. 10E shows a state in which each of first outlet port E1 and third outlet port E3 is communicatable. Each of the present drawings shows first to third openings M1 to M3 of valve 3 by solid lines, and shows first to third outlet ports E1 to E3 and continuous outlet port E4 of first housing 11 by broken lines, and shows regions of overlapping between the openings M1 to M3 and the outlet ports E1 to E4 by hatching.

In control valve CV, valve 3 is controlled depending on vehicle operation conditions such that a relative phase of first to third openings M1 to M3 with respect to first to third outlet ports E1 to E3 and continuous outlet port E4 accords principally with one of first to fifth phases shown in FIGS. 10A to 10E. This is performed by driving the electric motor 4 with control electric current outputted from electronic control unit CU which is calculated based on the vehicle operation conditions.

FIG. 10A shows the first phase in which third outlet port E3 out of first to third outlet ports E1 to E3 is in communication with third opening M3, while each of first outlet port E1 and second outlet port E2 is not in communication with any opening. This causes the cooling water to be supplied to only the radiator RD via third outlet port E3 and third pipe L3, at a supply rate that varies depending on an amount of overlapping between third outlet port E3 and third opening M3.

FIG. 10B shows the second phase in which second outlet port E2 out of first to third outlet ports E1 to E3 is in communication with second opening M2, while each of first outlet port E1 and third outlet port E3 is not in communication with any opening. This causes the cooling water to be supplied to only the oil cooler OC via second outlet port E2, at a supply rate that varies depending on an amount of overlapping between second outlet port E2 and second opening M2.

FIG. 10C shows the third phase in which continuous outlet port E4 is in communication, while each of first to third outlet ports E1 to E3 is not in communication with any opening. This causes the cooling water to be supplied to nothing of heater HT, oil cooler OC, and radiator RD, and be supplied more to throttle chamber TC via continuous outlet port E4 together with the cooling water introduced through bypass passage BL.

FIG. 10D shows the fourth phase in which first outlet port E1 and second outlet port E2 out of first to third outlet ports E1 to E3 are respectively in communication with first opening M1 and second opening M2, while third outlet port E3 is not in communication with any opening. In the fourth phase, this causes the cooling water to be supplied to heater HT and oil cooler OC via first outlet port E1 and second outlet port E2 respectively, at supply rates that vary depending on amounts of overlapping between first outlet port E1 and first opening M1 and between second outlet port E2 and second opening M2.

FIG. 10E shows the fifth phase in which first outlet port E1 and third outlet port E3 out of first to third outlet ports E1 to E3 are respectively in communication with first opening M1 and third opening M3, while second outlet port E2 is not in communication with any opening. In the fifth phase, this causes the cooling water to be supplied to heater HT and radiator RD via first outlet port E1 and third outlet port E3 respectively, at supply rates that vary depending on amounts of overlapping between first outlet port E1 and first opening M1 and between third outlet port E3 and third opening M3.

Control valve CV upon so-called cold start of the engine is controlled to the third phase so as to be in an all-closed state in which all of first to third outlet ports E1 to E3 are not in communication, as shown in FIG. 10C. Upon this cold start, third opening M3 and continuous outlet port E4 overlap with each other, and the cooling water is supplied more to throttle chamber TC from continuous outlet port E4 together with the cooling water introduced through bypass passage BL. Thus, throttle chamber TC upon the cold start is provided with the cooling water more than normal by establishing communication between continuous outlet port E4 and third opening M3 in addition to bypass passage BL, because of necessity for an antifreezing mean of throttle chamber TC upon the cold start. This serves to ensure a sufficient flow rate of the cooling water supplied from continuous outlet port E4 to throttle chamber TC, and thereby facilitates effective cooling of throttle chamber TC.

On the other hand, when the cooling water is heated after warming up of the engine, control valve CV is controlled to the first phase in which only the third outlet port E3 is in communication with third opening M3. On this occasion, as shown in FIG. 10A, third opening M3 and continuous outlet port E4 do not overlap with each other and are not in communication with each other, and continuous outlet port E4 discharges only the cooling water supplied from bypass passage BL. This suppresses continuous outlet port E4 from discharging an excess amount of the cooling water, and thereby serves to ensure a sufficient flow rate of the cooling water supplied from third outlet port E3 to radiator RD, and facilitates effective cooling of the cooling water. The same applies to the second, fourth, and fifth phases. Also in the second, fourth, and fifth phases, as shown in FIGS. 10B, 10D, and 10E, the state of non-overlapping and non-communication between continuous outlet port E4 and third opening M3 serves to ensure sufficient flow rates of the cooling water for heater HT, oil cooler OC, and radiator RD. Thus, continuous outlet port E4 and third opening M3 are set not to overlap with each other, in case that first to third openings M1 to M3 overlap with first to third outlet ports E1 to E3. This improves efficiency for supplying the cooling water to respective devices, i.e., heater HT, oil cooler OC, and radiator RD.

(Effects of First Embodiment) The conventional control valve is configured such that cooling water introduced from an inlet port flows into a continuous outlet port via only the bypass passage formed between the housing and the valve, and is supplied to a throttle chamber from the continuous outlet port. In the conventional control device, the bypass passage is the only passage connected to the continuous outlet port, and the flow passage sectional area is small. Accordingly, the conventional control device may be insufficient in flow rate of the cooling water required for anti-freezing of the throttle chamber.

On the other hand, the control valve according to the present embodiment causes the following effects, and thereby serves to solve the problem of the conventional control valve.

Control valve CV is the control valve for the cooling circuit of the prime mover of the automobile, and includes the rotational shaft 2, the housing 1, and the valve 3. The housing 1 includes: the valve container 111 in which the rotational shaft 2 is inserted; the primary communication port (i.e. inlet port E0) that is open to the valve container 111; the secondary communication port (i.e. outlet port E1, E2, or E3) that is open to the valve container 111 in the radial direction with respect to the rotational axis Z of the rotational shaft 2; and a continuous circulation port (i.e. continuous outlet port E4) that is open to the valve container 111, and is different from the secondary communication port (i.e. outlet port E1, E2, or E3) in position in the circumferential direction, and is positioned to overlap with the secondary communication port (i.e. outlet port E1, E2, or E3) in position in the axial direction parallel with the rotational axis Z, such that cooling water continuously flows through the continuous circulation port (i.e. continuous outlet port E4) due to cooperation with the primary communication port (i.e. inlet port E0). The valve 3 is disposed in the valve container 111, and is connected to the rotational shaft 2, and includes: the primary opening (i.e. inlet M0) overlapping with the primary communication port (i.e. inlet port E0); and the secondary opening (i.e. third opening M3, in the present embodiment) that overlaps with the continuous circulation port (i.e. continuous outlet port E4) in case that the secondary opening (i.e. third opening M3) is apart from the secondary communication port (i.e. outlet port E1, E2, or E3) depending on the rotational position of the rotational shaft 2.

As describes above, in control valve CV according to the present embodiment, continuous outlet port E4 overlaps with one of first to third openings M1 to M3 being the secondary openings (e.g. overlaps with third opening M3, in the present embodiment), in case that first to third openings M1 to M3 being the secondary openings do not overlap with first to third outlet ports E1 to E3 being the secondary communication ports. This allows the cooling water passing through bypass passage BL or internal passage 118 of valve 3 to be discharged via continuous outlet port E4, in case that first to third openings M1 to M3 do not overlap with first to third outlet ports E1 to E3, e.g., in case of the cold start of the engine. This serves to ensure a sufficient flow rate of the cooling water discharged from continuous outlet port E4, in case of requiring an increase amount of the cooling water supplied via continuous outlet port E4, e.g., in case of the cold start.

According to the present embodiment, depending on the rotational position of the rotational shaft 2, the secondary opening (i.e. opening M1, M2, or M3) overlaps with the secondary communication port (i.e. outlet port E1, E2, or E3) and is apart from the continuous circulation port (i.e. continuous outlet port E4).

Thus, after the warming up of the engine, the communication between continuous outlet port E4 and third opening M3 is shut off to suppress the excessive discharge of the cooling water from continuous outlet port E4. Instead of the cooling water flowing into continuous outlet port E4 via internal passage 118 of valve 3 and third opening M3, the cooling water supplied to respective devices such as heater HT, oil cooler OC, and radiator RD is increased by establishing communication between first to third outlet ports E1 to E3 and first to third openings M1 to M3. This serves to improve the efficiency for supplying the cooling water to the respective devices such as heater HT, oil cooler OC, and radiator RD, after the warming up.

According to the present embodiment, the continuous circulation port (i.e. continuous outlet port E4) has the oval shape elongated in the circumferential direction.

This increases continuous outlet port E4 in opening area, and thereby increases the flow rate of the cooling water flowing from internal passage 118 into continuous outlet port E4 when continuous outlet port E4 overlaps with third opening M3: i.e. ensures an increased flow rate of the cooling water discharged from continuous outlet port E4.

According to the present embodiment, the valve 3 includes the axial first end and the axial second end in the axial direction, and the rotational shaft 2 is connected to the axial first end of the valve 3, and the primary opening (i.e. inlet M0) is open at the axial second end of the valve 3, and the secondary opening (i.e. third opening M3, in the present embodiment) is open in the radial direction with respect to the rotational axis Z of the valve 3, and, in the axial direction, the continuous circulation port (i.e. continuous outlet port E4) is positioned nearer to the primary opening (i.e. inlet M0) than a center of the secondary opening (i.e. third opening M3, in the present embodiment).

Thus, continuous outlet port E4 according to the present embodiment is shifted in the axial direction toward inlet M0 with respect to the center (i.e. base line X in FIG. 8) of the secondary opening (i.e. third opening M3, in the present embodiment). This allows continuous outlet port E4 to be positioned nearer to an entrance (i.e. inlet M0) of internal passage 118, and thereby improves discharging efficiency of the cooling water discharged from continuous outlet port E4 via internal passage 118.

According to the present embodiment, the secondary opening (i.e. opening M1, M2, or M3) is greater in opening area than the continuous circulation port (i.e. continuous outlet port E4).

This increases an area of overlapping between continuous outlet port E4 and third opening M3, and thereby increases the flow rate of the cooling water flowing from internal passage 118 into continuous outlet port E4 when continuous outlet port E4 overlaps with third opening M3: i.e. ensures an increased flow rate of the cooling water discharged from continuous outlet port E4.

According to the present embodiment, the secondary communication port (i.e. outlet port E1, E2, or E3) is connected to at least one of the radiator RD, the heater HT, and the oil cooler OC.

This serves to increase the flow rate of the cooling water discharged from continuous outlet port E4, in case such as the cold start of the engine.

According to the present embodiment, the secondary communication port (i.e. third outlet port E3) is connected to the radiator RD.

In general, third outlet port E3 connected to radiator RD is set to be relatively large in flow passage sectional area, and along with this, third opening M3 is set to be relatively large in opening area. Accordingly, the configuration of allowing third opening M3 to overlap with continuous outlet port E4 serves to increase the flow rate of the cooling water discharged from continuous outlet port E4.

According to the present embodiment, the rotational shaft 2 is connected to the axial first end of the valve 3, and the primary opening (i.e. inlet M0) is open at the axial second end of the valve 3, and the secondary opening (i.e. third opening M3, in the present embodiment) is open in radial direction with respect to the rotational axis Z of the valve 3, and the housing 1 includes the primary-communication-port-side secondary communication port (i.e. second outlet port E2, in the present embodiment) positioned nearer, in the axial direction, to the primary communication port (i.e. inlet port E0) than the secondary communication port (i.e. third outlet port E3, in the present embodiment), and the valve 3 includes the primary-communication-port-side secondary opening (i.e. second opening M2, in the present embodiment) that overlaps with the primary-communication-port-side secondary communication port (i.e. second outlet port E2) depending on the rotational position of the rotational shaft.

Thus, the present embodiment shows a so-called two-tier structure in which second outlet port E2 is disposed nearer to inlet port E0 in the axial direction than third outlet port E3, and second opening M2 is disposed nearer to inlet M0 in the axial direction than third opening M3. This allows the cooling water to be supplied to a plurality of predetermined devices (i.e. oil cooler OC and radiator RD, in the present embodiment) via second outlet port E2 and third outlet port E3.

According to the present embodiment, the housing 1 includes the rotational-shaft-side secondary communication port (i.e. first outlet port E1, in the present embodiment) positioned nearer, in the axial direction, to the rotational shaft 2 than the secondary communication port (i.e. third outlet port E3, in the present embodiment), and the valve 3 includes the rotational-shaft-side secondary opening (i.e. first opening M1, in the present embodiment) that overlaps with the rotational-shaft-side secondary communication port (i.e. first outlet port E1) depending on the rotational position of the rotational shaft.

Thus, the present embodiment shows a so-called three-tier structure in which, in addition to the two-tier structure described above, first outlet port E1 is disposed nearer to rotational shaft 2 in the axial direction than third outlet port E3, and first opening M1 is disposed nearer to rotational shaft 2 in the axial direction than third opening M3. This allows the cooling water to be supplied to a plurality of predetermined devices (i.e. heater HT, oil cooler OC and radiator RD, in the present embodiment) via first outlet port E1, second outlet port E2, and third outlet port E3.

According to the present embodiment, the primary-communication-port-side secondary communication port (i.e. second outlet port E2) is connected to the oil cooler OC, and the secondary communication port (i.e. third outlet port E3) is connected to the radiator RD, and the rotational-shaft-side secondary communication port (i.e. first outlet port E1) is connected to the heater HT.

This allows the cooling water to be supplied to the respective devices, i.e. heater HT, oil cooler OC and radiator RD as described in the present embodiment.

According to the present embodiment, the present embodiment shows the first to fifth states (i.e. the first to fifth phases) depending on the rotational position of the rotational shaft 2. In the first state (i.e. the first phase), the secondary communication port (i.e. third outlet port E3) overlaps with the secondary opening (i.e. third opening M3), and the rotational-shaft-side secondary communication port (i.e. first outlet port E1) is apart from the rotational-shaft-side secondary opening (i.e. first opening M1), and the continuous circulation port (i.e. continuous outlet port E4) is apart from the secondary opening (i.e. third opening M3), and the primary-communication-port-side secondary communication port (i.e. second outlet port E2) is apart from the primary-communication-port-side secondary opening (i.e. second opening M2). In the second state (i.e. the second phase), the primary-communication-port-side secondary communication port (i.e. second outlet port E2) overlaps with the primary-communication-port-side secondary opening (i.e. second opening M2), and the secondary communication port (i.e. third outlet port E3) is apart from the secondary opening (i.e. third opening M3), and the continuous circulation port (i.e. continuous outlet port E4) is apart from the secondary opening (i.e. third opening M3), and the rotational-shaft-side secondary communication port (i.e. first outlet port E1) is apart from the rotational-shaft-side secondary opening (i.e. first opening M1). In the third state (i.e. the third phase), the continuous circulation port (i.e. continuous outlet port E4) overlaps with the secondary opening (i.e. third opening M3), and the rotational-shaft-side secondary communication port (i.e. first outlet port E1) is apart from the rotational-shaft-side secondary opening (i.e. first opening M1), and the secondary communication port (i.e. third outlet port E3) is apart from the secondary opening (i.e. third opening M3), and the primary-communication-port-side secondary communication port (i.e. second outlet port E2) is apart from the primary-communication-port-side secondary opening (i.e. second opening M2). In the fourth state (i.e. the fourth phase), the rotational-shaft-side secondary communication port (i.e. first outlet port E1) overlaps with the rotational-shaft-side secondary opening (i.e. first opening M1), and the primary-communication-port-side secondary communication port (i.e. second outlet port E2) overlaps with the primary-communication-port-side secondary opening (i.e. second opening M2), and the secondary communication port (i.e. third outlet port E3) is apart from the secondary opening (i.e. third opening M3), and the continuous circulation port (i.e. continuous outlet port E4) is apart from the secondary opening (i.e. third opening M3). In the fifth state (i.e. the fifth phase), the secondary communication port (i.e. third outlet port E3) overlaps with the secondary opening (i.e. third opening M3), and the rotational-shaft-side secondary communication port (i.e. first outlet port E1) overlaps with the rotational-shaft-side secondary opening (i.e. first opening M1), and the continuous circulation port (i.e. continuous outlet port E4) is apart from the secondary opening (i.e. third opening M3), and the primary-communication-port-side secondary communication port (i.e. second outlet port E2) is apart from the primary-communication-port-side secondary opening (i.e. second opening M2).

Based on this manner of control, the cooling water discharged from continuous outlet port E4 is increased particularly in the third state (i.e. the third phase). This serves to ensure a sufficient flow rate of the cooling water discharged from continuous outlet port E4.

According to the present embodiment, the housing 1 includes a plurality of the secondary communication ports (i.e. first to third outlet ports E1 to E3), and the valve 3 includes a plurality of the secondary openings (i.e. first to third openings M1 to M3).

This allows the cooling water to be supplied to the plurality of predetermined devices (i.e. heater HT, oil cooler OC and radiator RD) due to overlapping between first to third outlet ports E1 to E3 and first to third openings M1 to M3.

Figure 11:
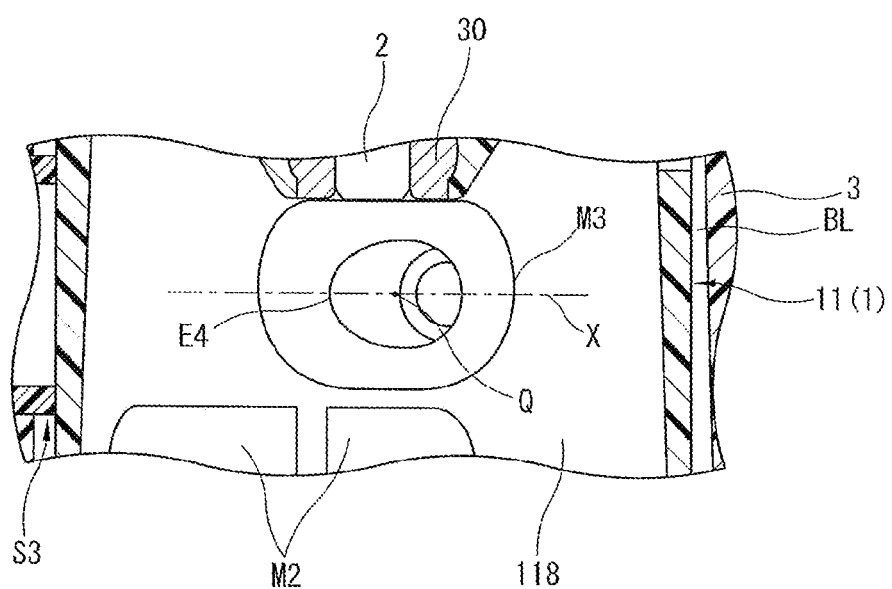
FIG. 11 shows a first modification of the control valve according to the first embodiment of the present invention, which corresponds to a view in a direction of an arrow E shown in FIG. 9.

(First Modification) FIG. 11 show a first modification of the first embodiment of the control valve according to the present embodiment, in which continuous outlet port E4 is changed in axial position in comparison with the first embodiment. Except for this change, the other basic configurations are same with the first embodiment. Accordingly, the configurations same with the first embodiment are represented by the same reference signs, omitting explanation thereof.

FIG. 11 corresponds to a view in a direction of an arrow E shown in FIG. 9, and shows a front view of continuous outlet port E4 and third opening M3 overlapping with each other, when viewed from an inside of valve 3. In the following explanation of the present drawing, the axial direction refers to the direction parallel with rotational axis Z of valve 3, and the radial direction refers to the direction perpendicular to rotational axis Z of valve 3, and the circumferential direction refers to the direction around rotational axis Z of valve 3.

According to the present modification, as shown in FIG. 11, continuous outlet port E4 is positioned at the center of third opening M3, in the axial direction. In detail, in the axial direction, center Q of continuous outlet port E4 is positioned in a vicinity of base line X shown in FIG. 11.

Thus, according to the present modification, the continuous circulation port (e.g. continuous outlet port E4) is positioned, in the axial direction, at the center of the secondary opening (e.g. third opening M3, in the present embodiment).

According to the present embodiment, as shown in FIG. 11, third opening M3 has the oval or ellipse shape, and has a maximum circumferential width at the center of third opening M3. Accordingly, the configuration to position the continuous outlet port E4 at the center of third opening M3 in the axial direction increases a time period in which continuous outlet port E4 and third opening M3 overlap with each other during rotation of valve 3. This serves to ensure an increased flow rate of the cooling water discharged from E4.

Figure 12:
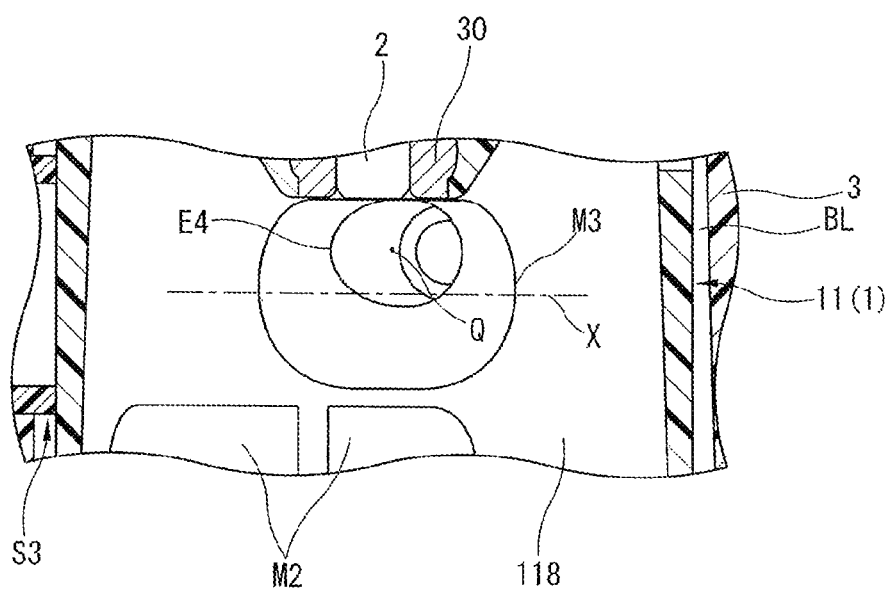
FIG. 12 shows a second modification of the control valve according to the first embodiment of the present invention, which corresponds to a view in the direction of the arrow E shown in FIG. 9.

(Second Modification) FIG. 12 show a second modification of the first embodiment of the control valve according to the present embodiment, in which continuous outlet port E4 is changed in axial position in comparison with the first embodiment. Except for this change, the other basic configurations are same with the first embodiment. Accordingly, the configurations same with the first embodiment are represented by the same reference signs, omitting explanation thereof.

FIG. 12 corresponds to a view in the direction of arrow E shown in FIG. 9, and shows a front view of continuous outlet port E4 and third opening M3 overlapping with each other, when viewed from the inside of valve 3. In the following explanation of the present drawing, the axial direction refers to the direction parallel with rotational axis Z of valve 3, and the radial direction refers to the direction perpendicular to rotational axis Z of valve 3, and the circumferential direction refers to the direction around rotational axis Z of valve 3.

According to the present modification, as shown in FIG. 12, continuous outlet port E4 is shifted in the axial direction toward first opening M1 with respect to the center of third opening M3. In detail, center Q of continuous outlet port E4 is positioned, in the axial direction, nearer to rotational shaft 2 than base line X of third opening M3 shown in FIG. 12: in other words, positioned in a farther side from inlet port E0 in the axial direction.

Thus, according to the present modification, the continuous circulation port (e.g. continuous outlet port E4) is positioned, in the axial direction, nearer to the rotational-shaft-side secondary communication port (e.g. first outlet port E1) than the center of the secondary opening (e.g. third opening M3, in the present embodiment).

The configuration to position the continuous outlet port E4 in the farther side from inlet port E0 makes more gradual a flow line of the cooling water flowing from intake port E0 to continuous outlet port E4 via third opening M3. This facilitates the flowing of the cooling water from internal passage 118 into continuous outlet port E4 via third opening M3, during the overlapping of continuous outlet port E4 and third opening M3. This serves to improve performance for discharging the cooling water, and thereby ensure a sufficient flow rate of the cooling water discharged from continuous outlet port E4.

Second Embodiment

Figure 13:
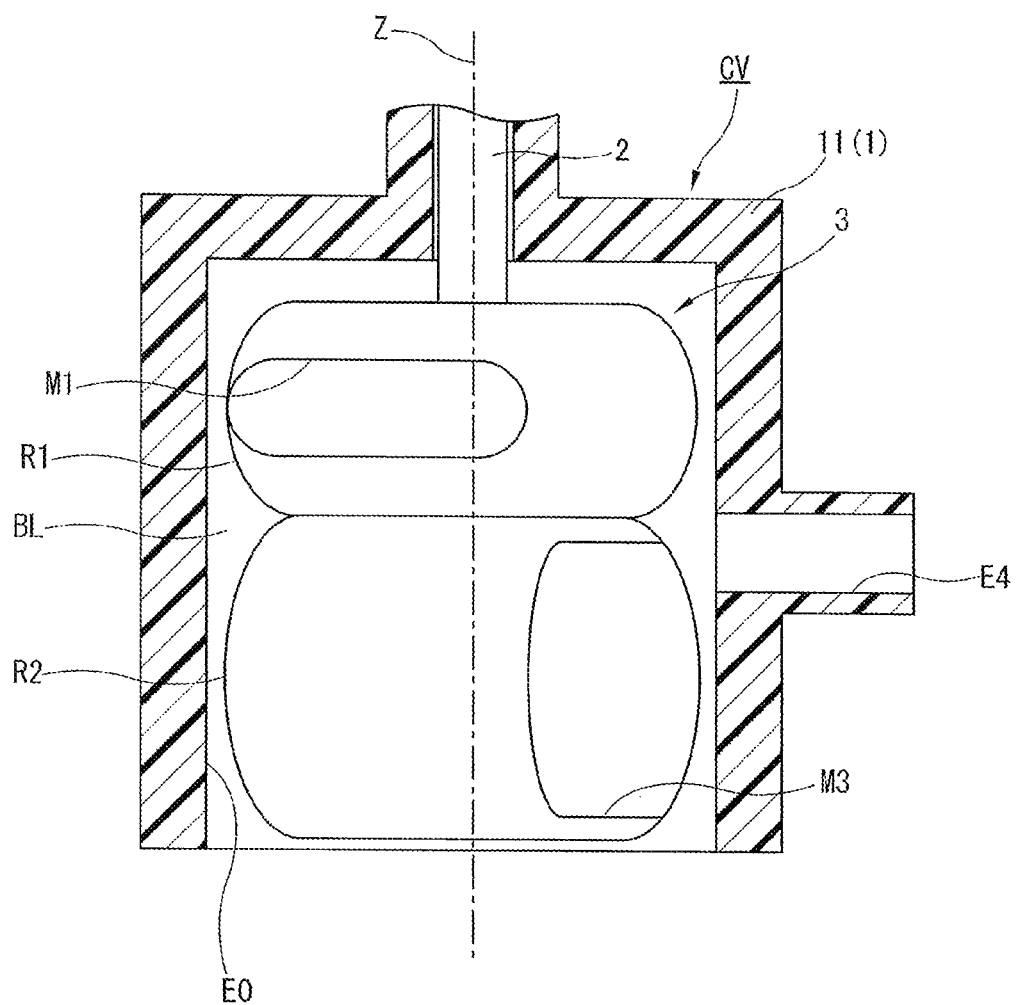
FIG. 13 shows a control valve according to a second embodiment of the present invention, which is a longitudinal sectional view of the control valve.

FIG. 13 shows a second embodiment of a control valve according to the present invention, in which valve 3 is changed in form, in comparison with the first embodiment. Except for this change, the other basic configurations are same with the first embodiment. Accordingly, the configurations same with the first embodiment are represented by the same reference signs, omitting explanation thereof.

FIG. 13 is a side view of valve 3 of control valve CV according to the second embodiment of the present invention. In the following explanation of the present drawing, the axial direction refers to the direction parallel with rotational axis Z of valve 3, and the radial direction refers to the direction perpendicular to rotational axis Z of valve 3, and the circumferential direction refers to the direction around rotational axis Z of valve 3.

As shown in FIG. 13, valve 3 of control valve CV according to the present embodiment is formed by connecting, in series in the axial direction, a first spherical part R1 and a second spherical part R2 each of which has a spherical shape, while valve 3 of control valve CV according to the first embodiment has the constant outer diameter. First spherical part R1 is positioned in the axial first side in valve 3, i.e., positioned nearer to rotational shaft 2 than second spherical part R2. Second spherical part R2 is positioned in the axial second side in valve 3, i.e., positioned nearer to inlet port E0 than first spherical part R1. First spherical part R1 is less in axial width than second spherical part R2. Furthermore, first spherical part R1 includes, at a predetermined circumferential position of valve 3, first opening M1 that is a through hole extending in the radial direction and having a shape elongated in the circumferential direction of valve 3 and being structured to overlap with first outlet port E1. Similarly, second spherical part R2 includes, at a predetermined circumferential position of valve 3, third opening M3 that is a through hole extending in the radial direction and having a shape elongated in the circumferential direction of valve 3 and being structured to overlap with third outlet port E3. Third opening M3 is structured to overlap also with continuous outlet port E4 formed at a circumferential position different from third outlet port E3. In other words, continuous outlet port E4 is formed in the peripheral wall of first housing 11, at an axial position to allow continuous outlet port E4 to overlap with third opening M3 of valve 3.

As described above, according to the present embodiment, valve 3 includes a spherical part (e.g. second spherical part R2, in the present embodiment) at least partially, and the spherical part includes the secondary opening (e.g. third opening M3, in the present embodiment).

Also such valve 3 with second spherical part R2 including third opening M3 may be an application target of the present invention, which produces the effects same with the first embodiment.

Although each of first and second spherical parts R1 and R2 according to the present embodiment includes a uniform spherical surface through a circumference thereof, it is not necessary to form a spherical surface through an entire circumference of the each of first and second spherical parts R1 and R2, provided that the spherical surface covers a circumferential range within which first to third seal members S1 to S3 is allowed to be in sliding contact with valve 3 due to rotation of valve 3. In other words, each of first and second spherical parts R1 and R2 may be formed only in the partial circumferential range within which the sliding contact of first to third seal members S1 to S3 is allowed.

The number of the spherical part(s) according to the present invention may be modified depending on specifications of control valve CV etc. Control valve CV may be configured to include one spherical part in total, while three spherical parts may be formed corresponding to first to third openings M1 to M3. Furthermore, in case that valve 3 rotates within a predetermined circumferential range, it is allowed to form two spherical parts in a circumferential region and form one spherical part in another spherical region.

The control valve according to the present invention is not limited to the embodiments etc. described above, and may be freely modified depending on specification of a device to which the present invention is applied, provided that the device can produce effects of the present invention.

For example, although the embodiments etc. above exemplify a case of the control valve employed in the circulation system of cooling water, the control valve may be employed not only for cooling water but also for various kinds of liquid such as lubrication oil.

Although the embodiments etc. above exemplify a case of providing three communication ports, i.e. first to three outlet ports E1 to E3, as the secondary communication ports according to the present invention, the number of the secondary communication port(s) is not limited to three (i.e. first to three outlet ports E1 to E3), but may be at least one.

Continuous outlet port E4 may be changed in shape and position, depending on specification of control valve CV. Furthermore, continuous outlet port E4 is not limited to the above embodiments configuring the continuous outlet port E4 to overlap with third opening M3, but may be configured to overlap with any one of first to third openings M1 to M3.

The following describes exemplary aspects of a control valve according to the above embodiments etc.

According to one aspect, the control valve is a control valve for a cooling circuit of a prime mover of an automobile, and includes a rotational shaft, a housing, and a valve. The housing includes: a valve container in which the rotational shaft is inserted; a primary communication port that is open to the valve container; a secondary communication port that is open to the valve container in a radial direction perpendicular to a rotational axis of the rotational shaft; and a continuous circulation port that is open to the valve container, and is different from the secondary communication port in position in a circumferential direction around the rotational axis, and is positioned to overlap with the secondary communication port in position in an axial direction parallel with the rotational axis, such that cooling water continuously flows through the continuous circulation port due to cooperation with the primary communication port. The valve is disposed in the valve container, and is connected to the rotational shaft, and includes: a primary opening overlapping with the primary communication port; and a secondary opening that overlaps with the continuous circulation port in case that the secondary opening is apart from the secondary communication port depending on a rotational position of the rotational shaft.

According to a favorable aspect of the control valve above, depending on the rotational position of the rotational shaft, the secondary opening overlaps with the secondary communication port and is apart from the continuous circulation port.

According to another aspect, in addition to one of the above aspects of the control valve, the continuous circulation port has a shape of an oval elongated in the circumferential direction.

According to still another aspect, in addition to one of the above aspects of the control valve, in the axial direction, the continuous circulation port is positioned at a center of the secondary opening.

According to still another aspect, in addition to one of the above aspects of the control valve, the valve includes an axial first end and an axial second end in the axial direction. The rotational shaft is connected to the axial first end of the valve. The primary opening is open at the axial second end of the valve. The secondary opening is open in the radial direction. In the axial direction, the continuous circulation port is positioned nearer to the primary opening than a center of the secondary opening.

According to still another aspect, in addition to one of the above aspects of the control valve, the secondary opening is greater in opening area than the continuous circulation port.

According to still another aspect, in addition to one of the above aspects of the control valve, the secondary communication port is connected to at least one of a radiator, a heater, and an oil cooler.

According to still another aspect, in addition to one of the above aspects of the control valve, the secondary communication port is connected to the radiator.

According to still another aspect, in addition to one of the above aspects of the control valve, the valve includes an axial first end and an axial second end in the axial direction. The rotational shaft is connected to the axial first end of the valve. The primary opening is open at the axial second end of the valve. The secondary opening is open in the radial direction. The housing includes a primary-communication-port-side secondary communication port positioned nearer, in the axial direction, to the primary communication port than the secondary communication port. The valve includes a primary-communication-port-side secondary opening that overlaps with the primary-communication-port-side secondary communication port depending on the rotational position of the rotational shaft.

According to still another aspect, in addition to one of the above aspects of the control valve, the housing includes a rotational-shaft-side secondary communication port positioned nearer, in the axial direction, to the rotational shaft than the secondary communication port. The valve includes a rotational-shaft-side secondary opening that overlaps with the rotational-shaft-side secondary communication port depending on the rotational position of the rotational shaft.

According to still another aspect, in addition to one of the above aspects of the control valve, the primary-communication-port-side secondary communication port is connected to the oil cooler. The secondary communication port is connected to the radiator. The rotational-shaft-side secondary communication port is connected to the heater.

According to still another aspect, in addition to one of the above aspects of the control valve, the control valve is structured to be in a first state, a second state, a third state, a fourth state, or a fifth state, depending on the rotational position of the rotational shaft. In the first state, the secondary communication port overlaps with the secondary opening, and the rotational-shaft-side secondary communication port is apart from the rotational-shaft-side secondary opening, and the continuous circulation port is apart from the secondary opening, and the primary-communication-port-side secondary communication port is apart from the primary-communication-port-side secondary opening. In the second state, the primary-communication-port-side secondary communication port overlaps with the primary-communication-port-side secondary opening, and the secondary communication port is apart from the secondary opening, and the continuous circulation port is apart from the secondary opening, and the rotational-shaft-side secondary communication port is apart from the rotational-shaft-side secondary opening. In the third state, the continuous circulation port overlaps with the secondary opening, and the rotational-shaft-side secondary communication port is apart from the rotational-shaft-side secondary opening, and the secondary communication port is apart from the secondary opening, and the primary-communication-port-side secondary communication port is apart from the primary-communication-port-side secondary opening. In the fourth state, the rotational-shaft-side secondary communication port overlaps with the rotational-shaft-side secondary opening, and the primary-communication-port-side secondary communication port overlaps with the primary-communication-port-side secondary opening, and the secondary communication port is apart from the secondary opening, and the continuous circulation port is apart from the secondary opening. In the fifth state, the secondary communication port overlaps with the secondary opening, and the rotational-shaft-side secondary communication port overlaps with the rotational-shaft-side secondary opening, and the continuous circulation port is apart from the secondary opening, and the primary-communication-port-side secondary communication port is apart from the primary-communication-port-side secondary opening.

According to still another aspect, in addition to one of the above aspects of the control valve, the valve includes a spherical part. The secondary opening is formed in the spherical part.

According to still another aspect, in addition to one of the above aspects of the control valve, the housing includes a plurality of the secondary communication ports. The valve includes a plurality of the secondary openings.

The invention claimed is:
1. A control valve for a cooling circuit of a prime mover of an automobile, the control valve comprising:
a rotational shaft, a housing, and a valve body, wherein:
the housing includes:
a valve container in which the rotational shaft is inserted, the valve body disposed in the valve container and connected to the rotational shaft;
a primary communication port that is open to the valve container;
a first secondary communication port that is open to the valve container in a radial direction perpendicular to a rotational axis of the rotational shaft; and
a continuous circulation port that is open to the valve container, is different from the first secondary communication port in position with respect to a circumferential direction around the rotational axis, and is positioned so as to overlap with the first secondary communication port in position with respect to an axial direction parallel with the rotational axis, such that cooling water is continuously flowable through the continuous circulation port due to cooperation with the primary communication port; and
the valve body includes:
a primary opening in communication with the primary communication port; and
a first secondary opening that is in communication with the continuous circulation port when the first secondary opening is not in communication with the first secondary communication port depending on a rotational position of the rotational shaft.

2. The control valve as claimed in claim 1, wherein depending on the rotational position of the rotational shaft, the first secondary opening is in communication with the first secondary communication port and is not in communication with the continuous circulation port.

3. The control valve as claimed in claim 1, wherein the continuous circulation port has a shape of an oval elongated in the circumferential direction.

4. The control valve as claimed in claim 3, wherein in the axial direction, the continuous circulation port is positioned at a center of the first secondary opening.

5. The control valve as claimed in claim 1, wherein:
the valve body includes an axial first end and an axial second end with respect to the axial direction;
the rotational shaft is connected to the axial first end of the valve body;
the primary opening is open at the axial second end of the valve body;
the first secondary opening is open in the radial direction; and
the continuous circulation port is positioned closer to the primary opening in the axial direction than a center of the first secondary opening.

6. The control valve as claimed in claim 1, wherein the first secondary opening is greater in opening area than the continuous circulation port.

7. The control valve as claimed in claim 1, wherein the first secondary communication port is connected to at least one of a radiator, a heater, and an oil cooler.

8. The control valve as claimed in claim 7, wherein the first secondary communication port is connected to the radiator.

9. The control valve as claimed in claim 8, wherein:
the valve body includes an axial first end and an axial second end with respect to the axial direction;
the rotational shaft is connected to the axial first end of the valve body;
the primary opening is open at the axial second end of the valve body;
the first secondary opening is open in the radial direction;

the housing includes a primary-communication-port-side secondary communication port positioned closer to the primary communication port in the axial direction than the first secondary communication port; and the valve body includes a primary-communication-port-side secondary opening that in in communication with the primary-communication-port-side secondary communication port depending on the rotational position of the rotational shaft.

10. The control valve as claimed in claim 9, wherein:

the housing includes a rotational-shaft-side secondary communication port positioned closer to the rotational shaft in the axial direction than the first secondary communication port; and the valve body includes a rotational-shaft-side secondary opening that is in communication with the rotational-shaft-side secondary communication port depending on the rotational position of the rotational shaft.

11. The control valve as claimed in claim 10, wherein:

the primary-communication-port-side secondary communication port is connected to the oil cooler;

the first secondary communication port is connected to the radiator; and the rotational-shaft-side secondary communication port is connected to the heater.

12. The control valve as claimed in claim 10, wherein:

the control valve is structured to be in a first state, a second state, a third state, a fourth state, or a fifth state, depending on the rotational position of the rotational shaft;

in the first state, the first secondary communication port is in communication with the first secondary opening, the rotational-shaft-side secondary communication port is not in communication with the rotational-shaft-side secondary opening, the continuous circulation port is not in communication with the first secondary opening, and the primary-communication-port-side secondary communication port is not in communication with the primary-communication-port-side secondary opening;

in the second state, the primary-communication-port-side secondary communication port is in communication with the primary-communication-port-side secondary opening, the first secondary communication port is not in communication with the first secondary opening, the continuous circulation port is not in communication with the first secondary opening, and the rotational-shaft-side secondary communication port is not in communication with the rotational-shaft-side secondary opening;

in the third state, the continuous circulation port is in communication with the first secondary opening, the rotational-shaft-side secondary communication port is not in communication with the rotational-shaft-side secondary opening, the first secondary communication port is not in communication with the first secondary opening, and the primary-communication-port-side secondary communication port is not in communication with the primary-port-side secondary opening;

in the fourth state, the rotational-shaft-side secondary communication port is in communication with the rotational-shaft-side secondary opening, the primary-communication-port-side secondary communication port is in communication with the primary-communication-port-side secondary opening, the first secondary communication port is not in communication with the first secondary opening, and the continuous circulation port is not in communication with the first secondary opening; and in the fifth state, the first secondary communication port is in communication with the first secondary opening, the rotational-shaft-side secondary communication port is in communication with the rotational-shaft-side secondary opening, the continuous circulation port is not in communication with the first secondary opening, and the primary-communication-port-side secondary communication port is not in communication with the primary-communication-port-side secondary opening.

13. The control valve as claimed in claim 1, wherein:

the valve body includes a spherical part; and the first secondary opening is formed in the spherical part.

14. The control valve as claimed in claim 1, wherein:

the housing includes a plurality of secondary communication ports open to the valve container in the radial direction, wherein the plurality of the secondary communication ports includes the first secondary communication port; and the valve body includes a plurality of secondary openings, each of which is in communication with a corresponding one of the plurality of the secondary communication ports depending on the rotational position of the rotational shaft, wherein the plurality of the secondary openings includes the first secondary opening.

* * * * *